United States Patent [19]
Ellersick et al.

[11] Patent Number: 6,038,226
[45] Date of Patent: Mar. 14, 2000

[54] COMBINED SIGNALLING AND PCM CROSS-CONNECT AND PACKET ENGINE

[75] Inventors: William F. Ellersick, Redwood City; Rocco Falcomato, Campbell; Steven Philip Saneski, Cupertino, all of Calif.

[73] Assignee: Ericcson Inc., Menlo Park, Calif.

[21] Appl. No.: 08/828,576

[22] Filed: Mar. 31, 1997

[51] Int. Cl.[7] .................................................. H04L 12/66
[52] U.S. Cl. .......................... 370/352; 370/458; 370/375; 370/376
[58] Field of Search .................................... 370/352, 375, 370/466, 467, 522, 523

[56] References Cited

U.S. PATENT DOCUMENTS

| | | | |
|---|---|---|---|
| 4,763,317 | 8/1988 | Lehman et al. | 370/58 |
| 4,782,479 | 11/1988 | Rozema | 370/68 |
| 4,967,405 | 10/1990 | Upp et al. | 370/1 |
| 5,165,092 | 11/1992 | Rickenbach et al. | 370/458 |
| 5,241,534 | 8/1993 | Omuro et al. | 370/16 |
| 5,282,195 | 1/1994 | Hood et al. | 370/58.1 |
| 5,375,121 | 12/1994 | Nishino et al. | 370/94.2 |
| 5,390,175 | 2/1995 | Hiller et al. | 370/60 |
| 5,412,498 | 5/1995 | Arstein et al. | 359/189 |
| 5,452,306 | 9/1995 | Turudic et al. | 370/110.1 |

OTHER PUBLICATIONS

Hornbach, B.H. et al:"5ESS–2000 Switch: The Next Generation Switching System" AT&T Technical Journal, vol. 72, No. 5, Sep. 1, 1993, pp. 4–12, XP000425021, New York (US) see whole document.

Yukio Nakano et al.: "Signal Processing for SDH Digital Cross–Connect System" Proceedings of the International Conference on Communications (ICC), vol. 2, May 23–26, 1993, pp. 900–904, XP000371210, Geneva (CH), see whole document.

Horning K: "Automatic Crossconnect Equipment," Hasler Mitteillungen, vol. 48, No. 1, 1989, pp. 26–32, XP000096191, Bern (CH), see paragraph 4.3.

*Primary Examiner*—Jeffery A. Hofsass
*Assistant Examiner*—Clement Townsend
*Attorney, Agent, or Firm*—Lyon & Lyon LLP

[57] ABSTRACT

A combined signalling and PCM cross-connect and packet assembly/disassembly engine includes a cross-connect memory, wherein the memory advantageously includes both a subscriber PCM channel memory that cross-connects bus side PCM channels to optical fiber timeslots, and a separate signalling memory that cross-connects associated signalling data channels to optical fiber timeslots. In particular, the PCM and signalling data memories are substantially the same size and each signalling data channel is mapped to an address in the signalling memory that corresponds to the PCM memory address of the associated PCM channel. Cross-connect information used for the PCM channels is also used to cross-connect the associated signalling channels. Cross-connect and packet engine functions are combined, thereby eliminating the need for a separate buffer to accommodate differences in transmission rates between them. A single control store with an associated fiber timeslot counter is also connected to the packet engine circuit, which supports both PCM and signalling data channels.

20 Claims, 12 Drawing Sheets

XMEMA

| NAME | ADDRESS | SIZE | DESCRIPTION |
|---|---|---|---|
| DPCM_M | PAGE 0: $0000 - $05FF<br>PAGE 1: $0800 - $0DFF | 1536 x 8 BITS<br>1536 x 8 BITS | DOWNSTREAM PCM DATA MEMORY. TWO PING-PONG BANKS WITH 1536 LOCATIONS PER BANK. |
| DSIG_M | PAGE 0: $1000 - $15FF<br>PAGE 1: $1800 - $1DFF | 1536 x 8 BITS<br>1536 x 8 BITS | DOWNSTREAM SIGNALLING DATA MEMORY. TWO PING-PONG BANKS WITH 1536 LOCATIONS PER BANK. |
| FXM_M<br>BITS 7:0 | PAGE 0: $0600 - $07FF<br>AND $0E00 - $0FBF | 960 x 8 BITS | FIBER CROSS CONNECT MEMORY, LOW BYTE, PAGE 0 |
| FXM_M<br>BITS 23:16 | PAGE 0: $1600 - $17FF<br>AND $1E00 - $1FBF | 960 x 8 BITS | FIBER CROSS CONNECT MEMORY, HIGH BYTE, PAGE 0. STORED IN BOTH XMEMA AND XMEMC, READ FROM WHICHEVER XMEM IS IDLE. |
| DCOMM_M | $0FE0 - $0FF8 | 24 x 8 BITS | DOWNSTREAM ONU COMM PACKET MEMORY. THREE 8 BYTE BANKS. THE NULL COMM PACKET IS STORED IN THE FIRST BUFFER. |
| INSRT_M | $1FC0 - $1FFF | 64 x 8 BITS | TEST INSERT MEMORY, 64 BYTES. |

*FIG. 8A*

XMEMB

| NAME | ADDRESS | SIZE | DESCRIPTION |
|---|---|---|---|
| UPCM_M | PAGE 0: $0000 - $05FF<br>PAGE 1: $0800 - $0DFF | 1536 x 8 BITS<br>1536 x 8 BITS | UPSTREAM PCM MEMORY. TWO PING-PONG BANKS WITH 1536 LOCATIONS PER BANK. |
| USIG_M | PAGE 0: $1000 - $15FF<br>PAGE 1: $1800 - $1DFF | 1536 x 8 BITS<br>1536 x 8 BITS | UPSTREAM SIGNALLING DATA MEMORY. TWO PING-PONG BANKS WITH 1536 LOCATIONS PER BANK. |
| FXM_M<br>BITS 7:0 | PAGE 1: $0600 - $07FF<br>AND $0E00 - $0FBF | 960 x 8 BITS | FIBER CROSS CONNECT MEMORY, LOW BYTE, PAGE 1 |
| FXM_M<br>BITS 23:16 | PAGE 1: $1600 - $17FF<br>AND $1E00 - $1FBF | 960 x 8 BITS | FIBER CROSS CONNECT MEMORY, HIGH BYTE, PAGE 1. STORED IN BOTH XMEMB AND XMEMD, READ FROM WHICHEVER XMEM IS IDLE. |
| UCOMM_M | $0FE0 - $0FF8 | 24 x 8 BITS | DOWNSTREAM ONU COMM PACKET MEMORY. THREE 8 BYTE BANKS. THE NULL COMM PACKET IS STORED IN THE FIRST BUFFER. |
| DROP_M | $1FC0 - $1FFF | 64 x 8 BITS | TEST DROP MEMORY, 64 BYTES. |

*FIG. 8B*

XMEMC

| NAME | ADDRESS | SIZE | DESCRIPTION |
|---|---|---|---|
| DPCMX_M | PAGE 0: $0000 - $05FF<br>PAGE 1: $0800 - $0DFF | 1536 x 8 BITS<br>1536 x 8 BITS | DOWNSTREAM PCMX DATA MEMORY. TWO PING-PONG BANKS WITH 1536 LOCATIONS PER BANK. |
| DSIGX_M | PAGE 0: $1000 - $15FF<br>PAGE 1: $1800 - $1DFF | 1536 x 8 BITS<br>1536 x 8 BITS | DOWNSTREAM SIGNALLING DATA MEMORY. TWO PING-PONG BANKS WITH 1536 LOCATIONS PER BANK. |
| FXM_M<br>BITS 15:8 | PAGE 0: $0600 - $07FF<br>AND $0E00 - $0FBF | 960 x 8 BITS | FIBER CROSS CONNECT MEMORY, SECOND BYTE, PAGE 0 |
| FXM_M<br>BITS 23:16 | PAGE 0: $1600 - $17FF<br>AND $1E00 - $1FBF | 960 x 8 BITS | FIBER CROSS CONNECT MEMORY, HIGH BYTE, PAGE 0. STORED IN BOTH XMEMA AND XMEMC, READ FROM WHICHEVER XMEM IS IDLE. |
| DCNC_IDL_M | PAGE 0: $0FC0 - $0FC7 | 8 x 8 BITS | DOWNSTREAM CONCENTRATION IDLE CODE MEMORY. |
| DCNC_TCD_M | PAGE 0: $0FC8 - $0FCF | 8 x 8 BITS | DOWNSTREAM CONCENTRATION TRUNK CONDITIONING MEMORY. |

FIG. 8C

XMEMD

| NAME | ADDRESS | SIZE | DESCRIPTION |
|---|---|---|---|
| UPCMX_M | PAGE 0: $0000 - $05FF<br>PAGE 1: $0800 - $0DFF | 1536 x 8 BITS<br>1536 x 8 BITS | DOWNSTREAM PCMX DATA MEMORY. TWO PING-PONG BANKS WITH 1536 LOCATIONS PER BANK. |
| USIGX_M | PAGE 0: $1000 - $15FF<br>PAGE 1: $1800 - $1DFF | 1536 x 8 BITS<br>1536 x 8 BITS | UPSTREAM SIGNALLING DATA MEMORY. TWO PING-PONG BANKS WITH 1536 LOCATIONS PER BANK. |
| FXM_M<br>BITS 15:8 | PAGE 1: $0600 - $07FF<br>AND $0E00 - $0FBF | 960 x 8 BITS | FIBER CROSS CONNECT MEMORY, SECOND BYTE, PAGE 1 |
| FXM_M<br>BITS 23:16 | PAGE 1: $1600 - $17FF<br>AND $1E00 - $1FBF | 960 x 8 BITS | FIBER CROSS CONNECT MEMORY, HIGH BYTE, PAGE 1. STORED IN BOTH XMEMB AND XMEMD, READ FROM WHICHEVER XMEM IS IDLE. |

FIG. 8D

| NAME | SIZE | DESCRIPTION |
|---|---|---|
| FIBERR | 128 x 12 | UPSTREAM FIBER ERROR FIFO, STORING ERROR TYPE AND TIMESLOT NUMBER |
| DSCAN_1 | 576 x 5 | DOWNSTREAM SIGNALLING SCAN MEMORY, HOLDING LAST SIGNALLING STATE ON EVEN BUS PCM TIMESLOTS |
| DSCAN_2 | 576 x 5 | DOWNSTREAM SIGNALLING SCAN MEMORY, HOLDING LAST SIGNALLING STATE ON ODD BUS PCM TIMESLOTS |
| DSIGCHG | 128 x 16 | DOWNSTREAM SIGNALLING SCAN CHANGE FIFO, HOLDING TIMESLOT NUMBER THAT CHANGED SIGNALLING AND NEW SIGNALLING STATE |
| USCAN | 960 x 5 | UPSTREAM SIGNALLING SCAN MEMORY, HOLDING LAST SIGNALLING STATE ON EACH FIBER PCM TIMESLOT |
| USIGCHG | 128 x 16 | UPSTREAM SIGNALLING SCAN CHANGE FIFO, HOLDING TIMESLOT NUMBER THAT CHANGED SIGNALLING AND NEW SIGNALLING STATE |
| BTS | 768 x 8 | BUS TIMESLOT TYPE CONTROL STORE, TWO TIMESLOTS PER 8 BIT WORD |
| BTSX | 768 x 8 | BUS TIMESLOT TYPE CONTROL STORE FOR EXPANSION PCM BUS, TWO TIMESLOTS PER 8 BIT WORD |
| BSIGTS | 64 x 16 | BUS SIGNALLING TIMESLOT MEMORY, HOLDING TIMESLOT NUMBER OF PCM CHANNEL ASSOCIATED WITH EACH SIGNALLING TIMESLOT THIS FRAME |
| UPAR | 256 x 1 | UPSTREAM SINGLE BIT DATA PACKET PARITY MEMORY |
| DPAR | 256 x 1 | DOWNSREAM SINGLE BIT DATA PACKET PARITY MEMORY |
| FSIGTS | 256 x 14 | FIBER SIGNALLING TIMESLOT MEMORY, HOLDING TIMESLOT NUMBER OF PCM CHANNEL ASSOCIATED WITH EACH DOWNSTREAM SIGNALLING BYTE THIS FRAME |

*FIG. 9*

| ROW | TS # | E1-E32 CHNL |
|---|---|---|
| 0 | 0 | X |
| 1 | 32 | X |
| 2 | 64 | X |
| 3 | 96 | X |
| 4 | 128 | TEST |
| 5 | 160 | 1 |
| 6 | 192 | 2 |
| 7 | 224 | X |
| 8 | 256 | 3 |
| 9 | 288 | 4 |
| 10 | 320 | 5 |
| 11 | 352 | X |
| 12 | 384 | 6 |
| 13 | 416 | 7 |
| 14 | 448 | 8 |
| 15 | 480 | X |
| 16 | 512 | 9 |
| 17 | 544 | 10 |
| 18 | 576 | 11 |
| 19 | 608 | X |
| 20 | 640 | 12 |
| 21 | 672 | 13 |
| 22 | 704 | 14 |
| 23 | 736 | X |
| 24 | 768 | 15 |
| 25 | 800 | X |
| 26 | 832 | 17 |
| 27 | 864 | X |
| 28 | 896 | 18 |
| 29 | 928 | 19 |
| 30 | 960 | 20 |
| 31 | 992 | X |
| 32 | 1024 | 21 |
| 33 | 1056 | 22 |
| 34 | 1088 | 23 |
| 35 | 1120 | X |
| 36 | 1152 | 24 |
| 37 | 1184 | 25 |
| 38 | 1216 | 26 |
| 39 | 1248 | X |
| 40 | 1280 | 27 |
| 41 | 1312 | 28 |
| 42 | 1344 | 29 |
| 43 | 1376 | X |
| 44 | 1408 | 30 |
| 45 | 1440 | 31 |
| 46 | 1472 | E1M SIG (CHAN 1-15) |
| 47 | 1504 | E1M SIG (CHAN 17-31) |

*FIG. 10*

| ROW | TS # | T1-T48 CHNL |
|---|---|---|
| 0 | 0 | 0 |
| 1 | 48 | 1 |
| 2 | 96 | 2 |
| 3 | 144 | |
| 4 | 192 | 3 |
| 5 | 240 | 4 |
| 6 | 288 | 5 |
| 7 | 336 | X |
| 8 | 384 | 6 |
| 9 | 432 | 7 |
| 10 | 480 | 8 |
| 11 | 528 | X |
| 12 | 576 | 9 |
| 13 | 624 | 10 |
| 14 | 672 | 11 |
| 15 | 720 | X |
| 16 | 768 | 12 |
| 17 | 816 | 13 |
| 18 | 864 | 14 |
| 19 | 912 | X |
| 20 | 960 | 15 |
| 21 | 1008 | 16 |
| 22 | 1056 | 17 |
| 23 | 1104 | X |
| 24 | 1152 | 18 |
| 25 | 1200 | 19 |
| 26 | 1248 | 20 |
| 27 | 1296 | X |
| 28 | 1344 | 21 |
| 29 | 1392 | 22 |
| 30 | 1440 | 23 |
| 31 | 1488 | T1M SIG T1-T48 |

*FIG. 11*

COMBINED SIGNALLING AND PCM CROSS-CONNECT AND PACKET ENGINE

FIELD OF THE INVENTION

The present invention pertains to the field of communication systems and, more particularly, to cross-connect circuitry for use in telecommunication networks.

BACKGROUND

In most modern telecommunication networks, a community of subscribers are connected to a central office switch through a two-way distributed network, which may include one or more transmission facilities, e.g., microwave, optical, electrical, etc., and which may utilize both digital and analog transmission protocols. In particular, between the central office switch and a respective subscriber termination, e.g., a remotely located subscriber line card, telecommunication signals are commonly digitized and multiplexed for transport over relatively high bandwidth shared transmission facilities, e.g., optical fiber, for greater network efficiency.

By way of example, in an exemplary optical communication network, an optical line terminal ("OLT") located at a central office transmits digital telecommunications data signals—i.e., pulse-code-modulated ("PCM") voice or data—between a co-located switch and a number of remotely located optical network units ("ONUs"), wherein the data is transmitted optically between the OLT and the respective ONUs over optical fibers, and electrically between the OLT and the switch. More particularly, the OLT terminates respective "bus side," or "switch side," communication lines (e.g., E1 or T1 lines) on one end and "fiber side" optical fibers on another. In the downstream direction, the OLT cross-connects PCM data contained in byte-size time-division-multiplexed bus side channels into designated fiber side channels, which are then packetized and converted from electrical to optical signals for transmission to respective ONUs. Similarly, in the upstream direction, the OLT converts receives optical signals to electrical signals, disassembling the incoming data packets into fiber side channels, which are then cross-connected into respective assigned switch channels for transmission to the switch.

Cross-connecting the respective switch and fiber channels is conventionally performed with a timeslot interchange switch circuit, wherein up to several thousand channels may be cross-connected in a single interchange system. For example, in a known cross-connect system, byte-size time-division-multiplexed switch channels transported on an eight-bit wide bus are input/output on one side of a timeslot interchange cross-connect system, and byte-size time-division-multiplexed fiber channels transported in serial bit streams are output/input at the other side, wherein the transmission of data channels on both sides of the cross-connect system is repeated at a data frame rate of eight KHz, i.e., with eight bits/channel transmitted every 125 microseconds in each direction, for an overall data rate of 64,000 bits per second (i.e., 64 kbps), per channel.

To perform the cross-connection of the respective PCM data channels, the timeslot interchange circuit must temporarily store the respective bytes of data for each channel in a unique location in an associated cross-connect memory, which is duplicated in both the upstream and downstream directions. For example, in the downstream direction, this has been done by addressing a left port of a dual-port memory with a timeslot counter for the switch channel side, and by addressing a right port of the same dual-port memory with the data from a control store memory containing the bus side channel number to be cross-connected to each fiber timeslot for the fiber channel side. The data buses of the control store memory are connected directly to byte-wide registers that receive and transmit data on the bus side from and to a byte-wide bus, and on the fiber side to parallel/serial and serial/parallel converters connected to opto-electrical circuitry, respectively. The control store memory is addressed by a fiber side timeslot counter. Data for each channel is stored in the cross-connect memory at an address corresponding to its bus side timeslot number. The control store memory is programmed through a second port by a microprocessor, with each address containing the bus side timeslot number of the channel to be cross-connected to the fiber timeslot having the same number as the address.

Higher capacity interfaces, such as Integrated Services Digital Network (ISDN) channels, can be carried over multiple 64 kbps channels internal to the network. To maintain the byte sequencing of these higher rate interfaces, timeslot interchange memories are usually organized into two banks that are alternately read from, and written to, respectively, by the switch and fiber sides of each frame. Thus, for a first frame in the downstream direction, the bus side writes to bank "zero," while the fiber side reads from bank "one." In the next frame, the bus side writes to bank one while the fiber side reads the data in bank zero, i.e., that was just written by the bus side, albeit in a different order. In this manner, all the data contained in a single frame on the bus side is carried in the next frame on the fiber side, and byte sequencing is maintained when multiple internal channels are reassembled into a higher rate interface to a respective ONU.

The cross-connection of signalling information associated with individual switch and fiber PCM data channels is complicated by the variations in multiframe signalling protocol used throughout the world. For example, under the applicable international (i.e., "E1") telecommunication transmission standard, signalling information is carried over a "signalling multiframe" comprising sixteen data frames, wherein each E1 data frame comprises thirty-two byte-size data channels transmitted at the basic telephony rate of 8 KHz (i.e., every 125 usecs), for an overall data rate of 2.048 mega bits per second (mbps). In particular, each E1 data frame contains a framing channel followed by fifteen subscriber PCM channels, a signalling channel, and another fifteen subscriber PCM channels, respectively, wherein each signalling channel carries four bits of signalling information each for two of the respective subscriber PCM channels (i.e., with the first signalling channel of each multiframe unused), such that, over the course of a sixteen frame signalling multiframe, each of the thirty PCM data channels has four signalling bits transmitted to go with sixteen bytes of PCM data.

On the other hand, under the applicable U.S. (i.e., "T1") standard, signalling multiframes comprising twenty-four T1 data frames are used, wherein each T1 data frame comprises twenty-four byte-size subscriber PCM channels transmitted, along with a single framing bit, every 125 usecs for an overall data rate of 1.544 mbps. Unlike the E1 standard, a "bit robbing" methodology is employed to carry signalling information in a T1 frame. In particular, each subscriber PCM channel carries one bit of its own signalling information in its least significant bit location every sixth frame. In this manner, over the course of a T1 signalling multiframe, each of the twenty-four subscriber PCM channels has four signalling bits transmitted to go with the twenty-four bytes of PCM data.

More recently, some signalling cross-connect systems have expanded on the above-described timeslot interchange circuit, by enlarging the cross-connect control store memory to contain sixteen locations for use in communication systems operating under the E1 standard (or twenty-four locations for communication systems operating under the T1 standard) for each fiber side timeslot, so that different fiber and switch timeslots can be cross-connected in each frame of a signalling multiframe. This configuration allows for signalling information for each of the fifteen (or twenty-four) subscriber channels associated with each bus side signalling channel to be cross-connected to the signalling information location associated with any of the fifteen (or twenty-four) subscriber channels in any of the fiber side signalling channels.

However, to ensure that the signalling information is not overwritten by another channel before it is "read out" by the respective other side of the cross-connect circuit, the signalling information associated with each subscriber channel must be stored at a unique address, which requires that the cross-connect memories be fifteen times (for E1) or twenty-four times (for T1) as large as the memory of a "simple" timeslot interchange circuit described above. In addition, the control store memory must also have fifteen (or twenty-four) times as many addresses with five more bits per location, since five is the first integer greater than the base-two logarithm of twenty-four. The larger control store also requires more complex firmware to write to fifteen (or twenty-four) locations for each subscriber channel and other locations for the associated signalling channels.

In addition to cross-connection of subscriber channels, the OLT must also perform the assembly and disassembly of data packets transmitted to, and received from, the respective ONUs. Conventionally, this packet assembly/disassembly ("PAD") function is performed by a "packet engine" that is separate from the cross-connect circuitry, wherein large memory buffers are required to accommodate the different data transmission rates on the respective switch and fiber sides of the OLT. A further control store is also needed to be able to control the PAD function for each fiber timeslot, e.g., wherein each further control store location contains a word that specifies whether the particular timeslot contains an overhead data pattern (e.g., for clock recovery or optical level acquisition), an OLT/ONU communications channel, or a subscriber PCM data channel from the bus side backplane bus.

Thus, there is a need for a system that combines cross-connect and packet engine circuitry, stores signalling information efficiently, and significantly reduces both the complexity and the memory requirements of the respective system hardware and firmware over the known art.

SUMMARY OF THE INVENTION

The present invention provides systems and apparatus that combine cross-connect and packet engine circuitry in a manner which improves efficiency of transient storage of signalling information channels, thereby significantly reducing cross-connect memory requirements, as well as reducing hardware and firmware complexity over the known art.

As deployed in a preferred OLT of an optical telecommunications network, a plurality of combined PCM and signalling channel cross-connect and packet assembly/disassembly ("XCONN/PAD") circuits each receive downstream PCM and signalling channels from a common eight-bit wide backplane bus, which are transmitted in successive 1536 channel frames at the standard telecommunications frame rate of 125 usec, i.e., for a bus side data rate of 12.288 mega bytes per second (MBps). The OLT may be configured to operate under either the E1 or T1 standard. When operating under the E1 standard, each 1536 channel bus side frame supports PCM and signalling channels for up to thirty-two E1 lines. When operating under the T1 standard, each 1536 channel bus side frame supports PCM and signalling channels for up to forty-eight T1 lines. In alternate preferred embodiments, multiple backplane busses may be used to increase system capacity.

In conjunction with a plurality of externally disposed memories, each XCONN/PAD circuit cross-connects the downstream "bus side" PCM and signalling channels into fiber side PCM and signalling channels, which are output in 960 channel frames over a downstream serial interface, i.e., for a fiber side data rate of 7.68 MBps. In particular, each XCONN/PAD circuit is provided with a two-page downstream PCM channel memory that cross-connects downstream PCM channels and a separate downstream signalling channel memory that cross-connects associated downstream signalling channels between the downstream backplane bus and fiber side serial interface.

In accordance with a more specific aspect of the invention, the respective downstream PCM and signalling channel memories are configured to be substantially the same size, wherein each downstream signalling channel is mapped to an address in the downstream signalling memory which corresponds to the address of its associated PCM channel in the downstream PCM memory. The downstream signalling channels are stored in the downstream signalling channel memory over a first signalling multiframe period and then read out into respective fiber side frames during the ensuing signalling multiframe period. Packetizing of downstream data frames for transmission to respective downstream ONUs is thereby easily accomplished because overhead channels are inserted in the proper fiber timeslots and PCM and signalling channels are cross-connected at the appropriate timeslots, thus avoiding the need for a separate control store and large FIFO for packet assembly. In other words, "real time" assembly of the fiber side PCM and signalling channel frames is accomplished.

Similarly, each XCONN/PAD circuit disassembles received upstream packets into successive 960 byte frames of received upstream packets into upstream fiber side PCM and signalling channels, which are transmitted over an upstream serial interface at a data rate of 7.68 MBps. In a reciprocal manner as the downstream data channels, the upstream fiber side PCM and signalling channels are cross-connected into respective bus side channels and multiplexed onto a common eight-bit wide upstream backplane bus at a rate of 12.288 MBps. More particularly, each XCONN/PAD circuit is also provided with a two-page upstream PCM channel memory that cross-connects the upstream PCM channels with a maximum delay of two frames and a separate upstream signalling channel memory that cross-connects associated upstream signalling channels with a maximum delay of two respective signalling multiframes between the respective upstream serial interface and backplane bus.

As with the downstream memories, the respective upstream PCM and signalling channel memories are configured to be substantially the same size, wherein each upstream signalling channel is mapped to an address in the upstream signalling memory which corresponds to the address of its associated PCM channel in the upstream PCM memory. The upstream signalling channels are stored in the upstream signalling channel memory over a first signalling multiframe period and then read out into respective 1536 channel bus side frames during the ensuing signalling multiframe period.

Advantageously, upstream and downstream "expansion" buses can be employed on the bus side, in conjunction with expansion, or duplicate, upstream and downstream memories, to effectively double system capacity. In an exemplary embodiment, the expansion buses are implemented as eight-bit-wide buses, similar to the primary buses. The fiber side cross-connect address control store memory preferably includes an extra bit that can be used to choose which memory is employed and to indicate whether upstream data is to be taken from the primary bus or the expansion bus.

Accordingly, it is a general object of the present invention to provide systems and apparatus that simultaneously perform the functions of PCM and signalling channel cross-connect and packet assembly/disassembly, with minimal memory and firmware requirements.

Other and further objects, features, aspects, and advantages of the present invention will become better understood with the following detailed description of the accompanying drawings.

BRIEF DESCRIPTION OF THE DRAWINGS

The drawings illustrate both the design and utility of preferred embodiments of the present invention, in which:

FIGS. 8A–D are tables describing the mapping of multiple dual port memories into external single port memories that are accessed and controlled by a preferred external memory access module ("XMAM") in the XCONN/PAD circuit of FIG. 4;

FIG. 9 is a table describing internal memories of the XMAM of the XCONN/PAD circuit of FIG. 4;

FIG. 10 is a table showing exemplary timeslot assignments for bus side PCM data and signalling channels in a preferred OLT when operating under the E1 standard; and FIG. 11 is a table showing exemplary timeslot assignments for bus side PCM data and signalling channels in a preferred OLT when operating under the T1 standard.

DETAILED DESCRIPTION OF THE PREFERRED EMBODIMENTS

Figure 1:
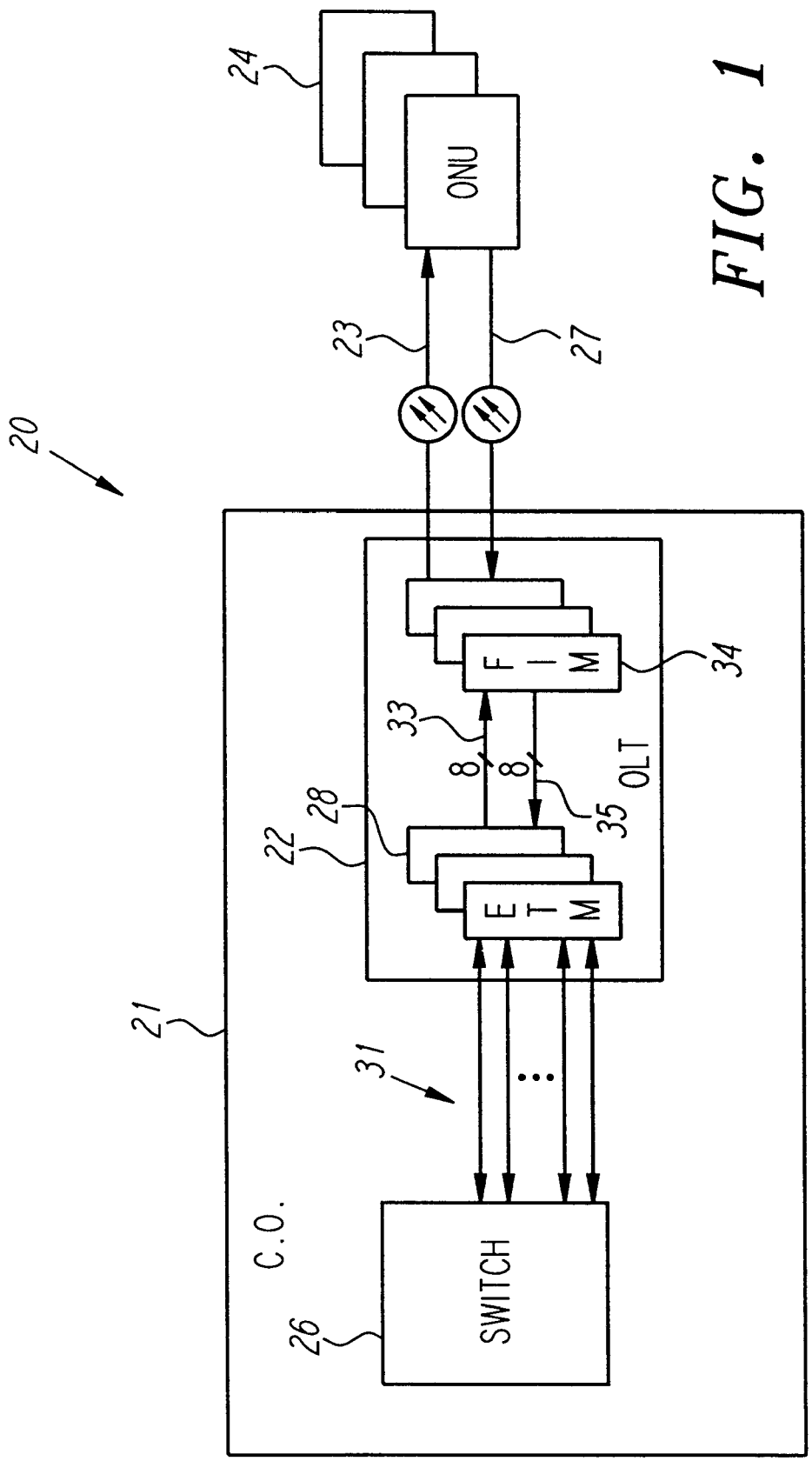
FIG. 1 is a simplified block diagram of an exemplary optical communication network employing a preferred OLT for transmitting time-division-multiplexed PCM and signalling channels between a central office switch and a number of remotely located ONUs.

Referring to FIG. 1, an exemplary telecommunications network 20 includes a central office 21 housing a switch 26 and an OLT 22. A plurality of E1 or T1 transmission lines 31 transport time-division-multiplexed PCM and signalling data channels between the switch 26 and the OLT 22. In particular, the transmission lines 31 may be E1 lines if the OLT 22 is operating under the E1 standard (e.g., as set forth in CCITT 802.4), or T1 lines if the OLT 22 is operating under the applicable T1 standards. Within the OLT 22, the E1/T1 lines 31 are terminated on a plurality of respective E1 or T1 module ("ETM") circuits 28. In alternate preferred embodiments, some of the ETMs 28 may be replaced with other types of communication interface circuit boards, such as, e.g., Sonet interface circuit boards.

In the downstream direction, the ETMs 28 reformat the respective T1 or E1 lines into successive frames containing 1536 byte-size subscriber PCM and signalling channels, which are then multiplexed onto an eight-bit wide downstream data bus 33 (i.e., for a "bus side" data rate of 12.288 MBps). In particular, the ETMs 28 reformat the downstream signalling data into separate respective signalling channels associated with a single subscriber channel, wherein a single subscriber signalling channel containing four bits of signalling information is transmitted every signalling multiframe—i.e., every sixteen frames when operating under the E1 standard or every twenty-four frames when operating under the T1 standard.

In a presently preferred embodiment, when operating under the E1 standard, each downstream frame on bus 33 delivers PCM and signalling channels for up to thirty-two E1 lines, wherein the individual subscriber channels for each respective E1 are spread over forty-eight byte-size "timeslots." A table showing exemplary timeslot assignments for the PCM data and signalling channels when operating under the E1 standard is shown in FIG. 10. When operating under the T1 standard, each 1536 byte bus side frame delivers PCM and signalling channels for up to forty-eight T1 lines, wherein the individual subscriber channels for each respective T1 are spread over thirty-two timeslots. A table showing exemplary timeslot assignments for the PCM data and signalling channels when operating under the T1 standard is shown in FIG. 11.

Referring to the timeslot assignment table shown in FIG. 10, when operating under the E1 standard, each downstream frame is multiplexed from the ETMs 28 onto downstream bus 33 in forty-eight successive "rows" 0–47, each row containing thirty-two timeslots corresponding to E1 lines 1–32 ("E1–E32")—i.e., where row 0 contains timeslot nos. 0–31; row 1 contains timeslot nos. 32–63, and so on, through row 47, which contains timeslot nos. 1504–1535. In the exemplary timeslot assignments shown in FIG. 10, rows 0–3, 7, 11, 15, 19, 23, 25, 27, 31, 35, 39, and 43 are inactive; row 4 is used for test purposes; rows 5–6, 8–10, 12–14, 16–18, 20–22, 24, 26, 28–30, 32–34,, 36–38, 40–42, and 44–45 are assigned to subscriber PCM channels 1–15 and 17–31 of each respective E1 line; row 46 is used for the signalling channel corresponding to subscriber PCM channels 1–15; and row 47 is used for the signalling channel corresponding to subscriber PCM channels 17–31. Thus, the data in the signalling channels changes progressively with each frame for the duration of the signalling multiframe, such that, e.g., in frame 0, a signalling multiframe patern is carried in row 46; and in frame 1, signalling data for channel 1 is carried in row 46; etc. It is to be understood that these are merely exemplary timeslot assignments.

Referring to the timeslot assignment table shown in FIG. 11, when operating under the T1 standard, each downstream frame is multiplexed from the ETMs 28 onto downstream bus 33 in thirty-two successive "rows" 0–31, each row containing forty-eight timeslots corresponding to T1 lines 1–48 ("T1–T48")—i.e., where row 0 contains timeslot nos. 0–47; row 1 contains timeslot nos. 48–95, and so on, through row 31, which contains timeslot nos. 1488–1535. In the exemplary timeslot assignments shown in FIG. 11, rows 3, 7, 11, 15, 19, 23, and 27 are inactive; rows 0–2, 4–6, 8–10, 12–14, 16–18, 20–22, 24–26, and 28–30 are used for subscriber PCM channels 0–23 of each respective T1 line; and row 31 is used for the signalling channel corresponding to subscriber PCM channels 1–48. It is to be understood that these are merely exemplary timeslot assignments. As will be appreciated by those of ordinary skill in the art, timeslots labeled "inactive" for purposes of the above example are merely inactive vis a vis E1 (or T1) PCM subscriber information. Other information can readily be transmitted in channels labeled "inactive" for purposes of the above example.

From the ETM boards 28, the respective downstream PCM and (reformatted) signalling channels are multiplexed onto the common eight-bit wide data bus 33 and transmitted to a plurality of fiber interface module ("FIM") circuit boards 34, also located in the OLT 22. Similarly, a second eight-bit wide data bus 35 carries upstream PCM and signalling channels from the respective FIM boards 34 to the ETMs 28. As is described in greater detail herein, each of the FIM circuit boards 34 cross-connects downstream bus side PCM and signalling channels received from downstream data bus 33 into fiber side PCM and signalling channels, respectively. The fiber side channels are assembled into time-division-multiplexed packets for optical transmission over respective downstream fiber cables 23 to a respective plurality of remotely located ONUs 24. At each ONU 24, the received downstream optical data packets are converted to electrical signals, disassembled back into PCM and signalling channels, and forwarded to respective subscriber lines (not shown).

Similarly, upstream time-division-multiplexed data packets are assembled at the individual ONUs 24 and optically transmitted over a plurality of upstream fiber cables 27 to the plurality of FIM boards 34 at the OLT 22. Received upstream optical data packets are converted to electrical signals and disassembled into respective upstream fiber side PCM and signalling channels. The upstream fiber side channels are cross-connected into upstream bus side channels and multiplexed onto the upstream data bus for transmission to the plurality of ETM boards 28.

In alternate preferred embodiments, the respective downstream and upstream data busses 33 and 35 may be duplicated to increase the system capacity. Additional back-up busses (not shown) are also preferably provided in both directions in case of failure.

Figure 2:
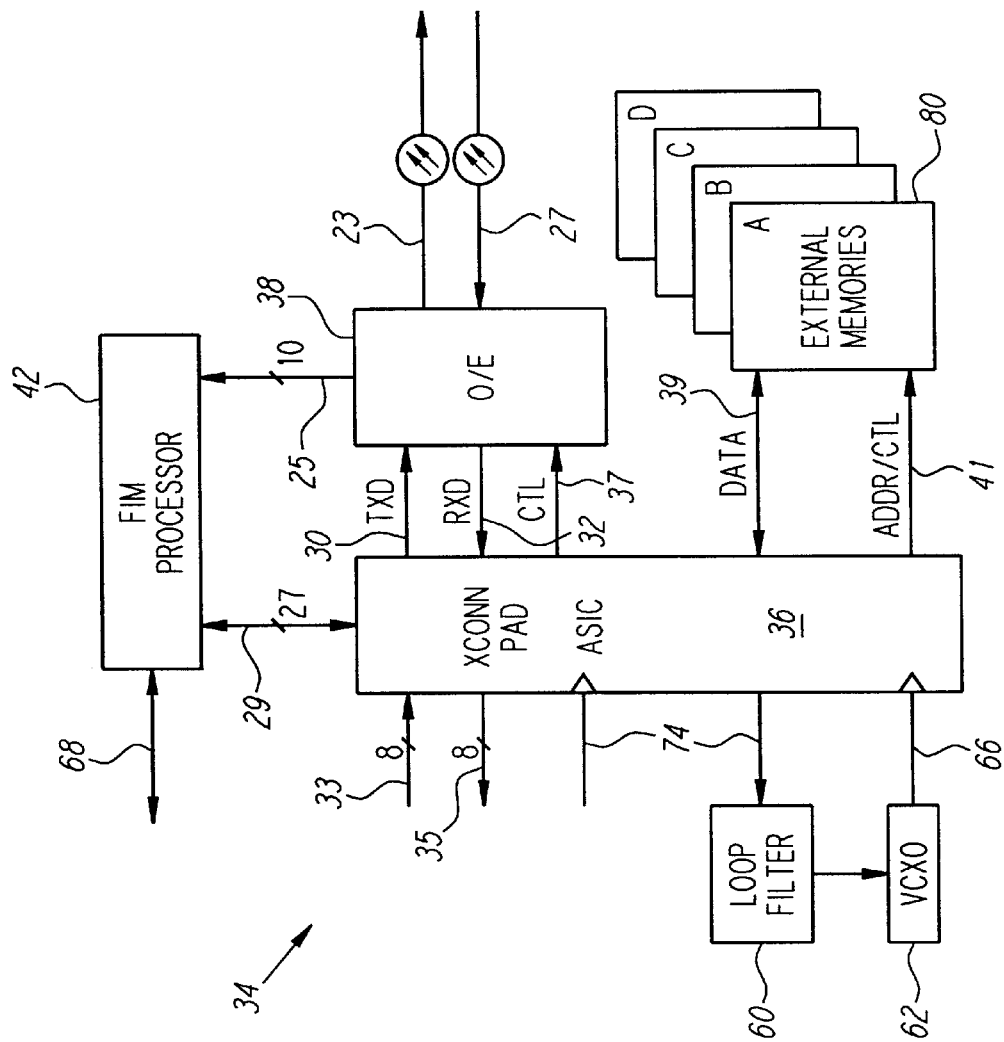
FIG. 2 is a simplified functional block diagram of a preferred fiber interface module ("FIM") circuit board employed in the OLT of FIG. 1.

Referring to FIG. 2, an exemplary preferred FIM circuit board 34 includes a cross-connect and packet assembly/disassembly ("XCONN/PAD") circuit 36, which can be implemented as part of an application specific integrated circuit ("ASIC"), and an opto-electronic converter ("O/E") circuit 38 configured to receive downstream data from, and transmit upstream data to, respectively, the XCONN/PAD circuit 36. In particular, the O/E circuit 38 converts downstream electrical signals transmitted from the XCONN/PAD circuit 36 into information-equivalent optical signals for transmission over a downstream fiber 23 to one or more ONUs 24 (not shown in FIG. 2) associated with that particular FIM board 34, and vice-versa. A presently preferred embodiment of the O/E circuit 38 is described more fully in U.S. patent application Ser. No. 08/608,166, entitled "DC Coupled receiver for Shared Optical System," filed Mar. 20, 1996, which is fully incorporated herein by reference.

The FIM board 34 also includes a processor 42 with a memory (not shown), that controls, configures, and monitors the performance of the XCONN/PAD and O/E circuits 36 and 38, respectively. The FIM processor 42 communicates via a processor control link 68 with the processors of each of the other FIM boards 34, as well as respective processors (not shown) of the ETM circuit boards 28, in the OLT 22. A twenty-seven-bit wide processor address and data bus 29 links the FIM processor 42 to the XCONN/PAD circuit 36. The FIM processor also receives the incoming optical power level 25 from the O/E circuit 38. Control inputs 37 sent from the XCONN/PAD circuit 36 are used to control the O/E circuit 38.

As is described in greater detail below, in conjunction with the FIM processor 42 and four external memories 80, the XCONN/PAD circuit 36 cross-connects the downstream bus side PCM and signalling channels into fiber side PCM and signalling channels, which are packetized in 960 channel downstream data frames over a downstream serial interface 30, i.e., for a fiber side data rate of 7.68 MBps. Similarly, the XCONN/PAD circuit 36 receives 960 channel packets of upstream PCM and signalling channels from the O/E circuit 38 over an upstream serial interface 32 at the data rate of 7.68 MBps, and cross-connects the upstream fiber side channels into respective bus side upstream channels, which are then multiplexed onto the upstream data bus 35 at a data rate of 12.288 MBps.

As will be apparent to those skilled in the art, the difference in the respective bus and fiber side data rates is due to the number of "inactive" (i.e., unassigned) bus side channels at any given FIM card 34, which are eliminated on the fiber side. In particular, the respective channels in each 1536 byte downstream frame transmitted over the downstream bus 33 are allocated across all of the respective plurality of FIM boards 34, depending on the specific configuration of the network 20.

In order to clock the respective downstream and upstream bus side channels, the XCONN/PAD circuit 36 receives a 12.288 MHz input clock signal 74. A loop filter 60 and associated voltage-controlled crystal oscillator (VCXO) 62 are employed by the XCONN/PAD circuit 36 to generate a 61.44 MHz clock signal 66, which is synchronized to the 12.288 MHz input clock signal 74, for clocking the respective 960 byte fiber side data frames over the downstream and upstream serial interfaces 30 and 32 (i.e., on a bit-by-bit basis).

The external memories 80 store downstream and upstream data, which is transferred between the XCONN/PAD circuit 36 and the memories 80 via a two-way data link 39, and an address/control input 41.

For ease in illustrating aspects and features of the present invention, the downstream cross-connect and packet assembly operation of the XCONN/PAD circuit 36 are described below. As will be apparent from the present disclosure to those skilled in the art, the upstream packet disassembly and cross-connect process is performed in essentially the same (albeit reversed) manner.

Figure 3:
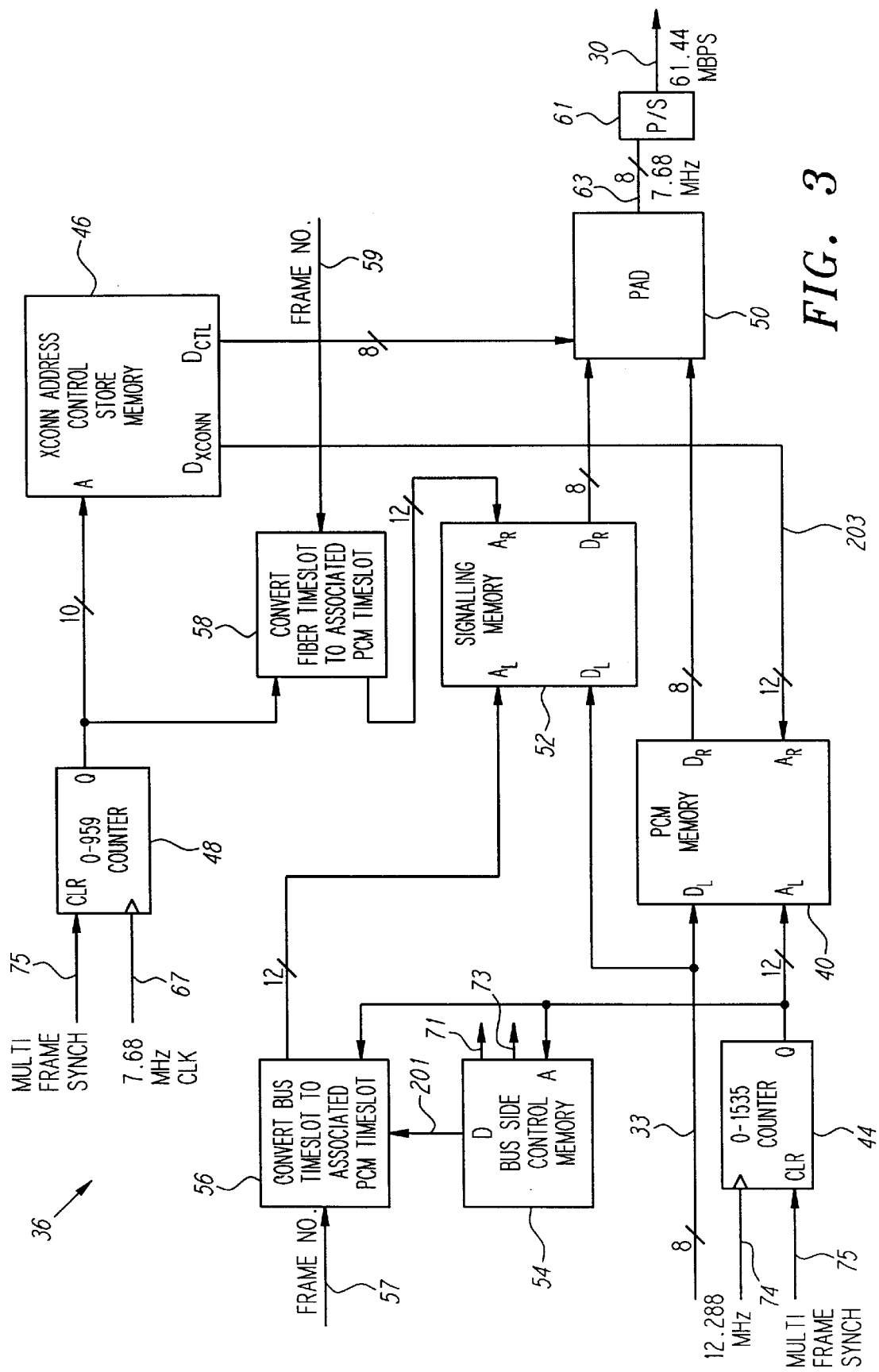
FIG. 3 is a simplified functional block diagram of the downstream data flow through a preferred cross-connect and packet assembly/disassembly ("XCONN/PAD") circuit employed in the FIM circuit board of FIG. 2.

Referring to FIG. 3, downstream PCM and signalling channels are received by the XCONN/PAD circuit 36 from the eight-bit wide backplane bus 33 in frames containing 1536 channels every 125 usec, wherein the respective PCM channels are routed to a downstream PCM memory 40, and the signalling channels are routed to a downstream signalling memory 52, respectively. In accordance with known telecommunication cross-connect design methodologies, not all of the bus side PCM and signalling channels are "active" (i.e., assigned to respective subscribers) on any given FIM card 34, and respective write enables (not shown) are input to the downstream PCM and signalling memories 40 and 52, so that only the active PCM and signalling channels are stored therein.

More particularly, as each new downstream data frame is received off the bus 33, the active PCM channels are written into a bus side data port of the downstream PCM memory 40. A bus side timeslot counter 44 clocked by the 12.288 MHz clock signal 74 transmits a twelve-bit bus timeslot address corresponding to each received PCM channel to an address input of the downstream PCM memory 40, i.e., wherein the bus timeslot address corresponds to the respective timeslot number of the PCM channel being stored. In this manner, the data contained in the active PCM channels in each downstream frame is stored in the downstream PCM memory 40 according to its respective bus side timeslot number. Eleven bits of the bus timeslot address are used for addressing a page of the downstream PCM memory 40, which is implemented effectively as a dual port, two-page, memory, as discussed in greater detail hereinbelow. The twelfth bit is used to determine whether to address to the first page or the second page of the memory 40. The counter also receives a multiframe synchronization pulse 75 at the beginning of each new signalling multiframe received off bus 33.

The twelve-bit bus side timeslot address is also sent to a bus side control memory 54 and a bus signalling timeslot conversion circuit 56, which converts bus timeslot numbers within each frame to associated PCM timeslot numbers within the frame. The bus side control memory 54 is decoded to provide write enable signals 71, 73 to the downstream PCM memory 40 and the downstream signalling memory 52, respectively. Additionally, the bus side control memory 54 sends to the bus signalling timeslot conversion circuit 56 a four-bit datafield 201 that specifies whether each timeslot has been assigned to a PCM channel, a signalling channel, or is inactive. The bus signalling timeslot conversion circuit 56 also receives a frame number 57, which runs from 0 to 23 for T1 applications, and from 0 to 15 for E1 applications. The bus signalling timeslot conversion circuit 56 builds a table of the timeslot numbers of active PCM channels that have their signalling carried in the current frame, looks up entries in that table during signalling timeslots, and sends a corresponding twelve-bit address signal to a bus side address input of the downstream signalling memory 52.

The cross-connect address control store memory 46 controls the readout of the respective PCM channels stored in the downstream PCM memory 40 through a fiber side data port by transmitting a twelve-bit fiber side address 203 to a fiber side address input 57 of the downstream PCM memory 40. An associated fiber timeslot counter 48 is clocked by a 7.68 MHz clock signal 67, which is derived from the 61.44 MHz clock signal 66 shown in FIG. 2. The fiber timeslot counter 48 also receives the multiframe synch pulse 75 at the start of each signalling multiframe and sends a ten-bit wide address signal to the cross-connect address control store memory 46. This signal (the output of the counter 48) changes state with each clock pulse such that the counter 48 counts from zero to 959 and then resets to zero with the start of the next frame. The ten-bit wide signal output by the fiber timeslot counter 48 is sent to a fiber signalling timeslot conversion circuit 58 that converts fiber timeslot numbers within each frame to associated PCM timeslot numbers within the frame. The fiber signalling timeslot conversion circuit 58 also receives a frame number 59 and sends a twelve-bit-wide address signal to the downstream signalling memory 52, which sends an eight-bit-wide downstream signalling data signal to the PAD circuit 50.

The cross-connect address control store memory 46 sends an eight-bit control word to a packet assembly/disassembly ("PAD") circuit (or "packet engine") 50, which also receives an eight-bit wide downstream data signal from the downstream PCM memory 40. The PAD circuit 50 sends eight-bit-wide downstream data 63 at a rate of 7.68 MHz to a parallel-to-serial conversion circuit ("P/S") 61, which outputs the cross-connected downstream data 30—which has been adjusted to the fiber rate of 61.44 mbps and packetized with various protocol inserted—from the XCONN/PAD circuit 36 to the O/E 38. As one of skill in the art would readily perceive, the above description of downstream data travel can effectively be reversed to convey a similar understanding of upstream data flow.

Figure 4:
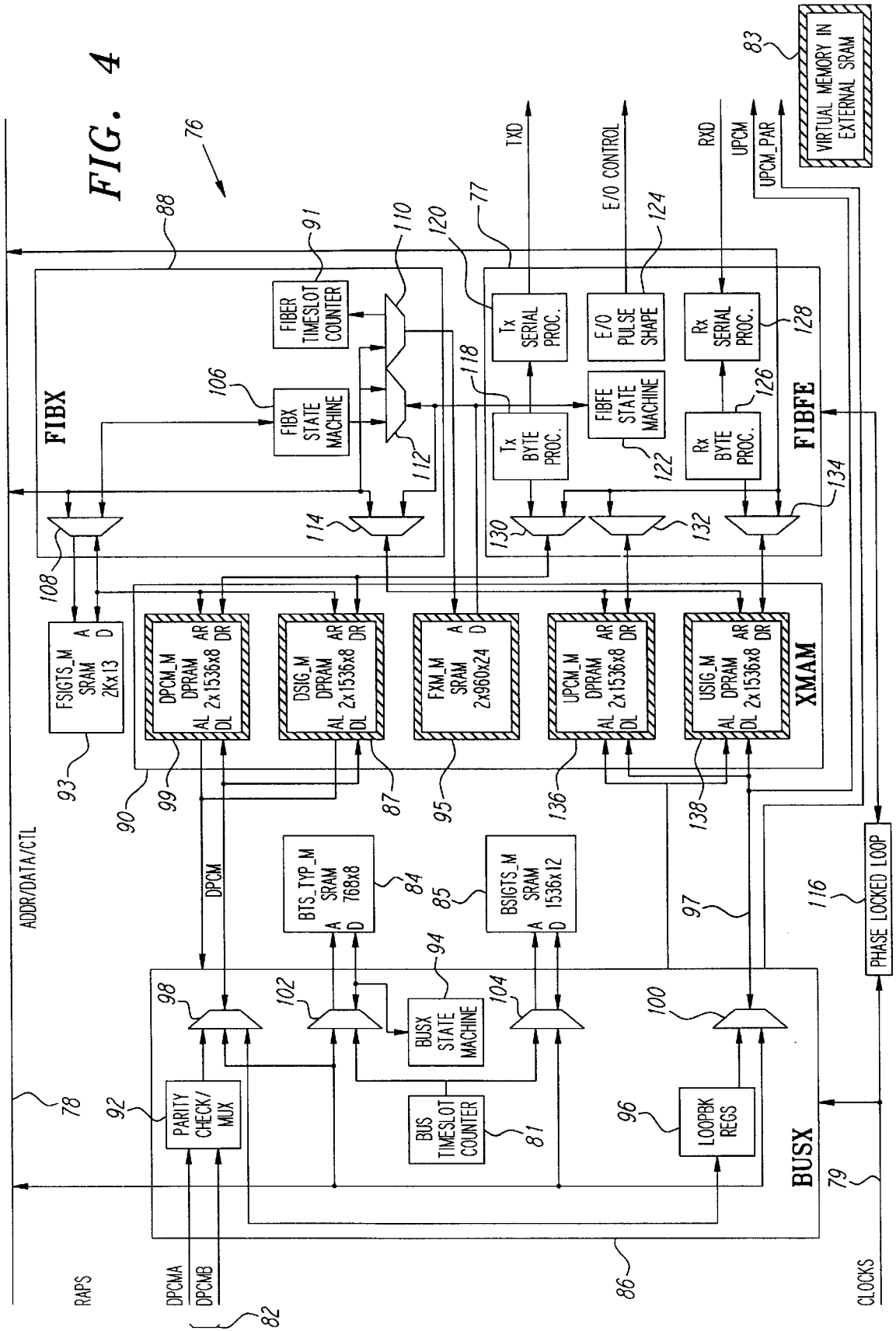
FIG. 4 is a more detailed functional block diagram of a preferred XCONN/PAD circuit employed in the FIM circuit board of FIG. 2.

Referring to FIG. 4, a presently preferred XCONN/PAD circuit 76 is preferably implemented as a single ASIC, including four major modules: a bus side cross-connect ("BUSX") module 86; a fiber side cross-connect ("FIBX") module 88; a fiber front end ("FIBFE"), or packet engine, module 77; and an external memory access module ("XMAM") 90. The following description discusses functional data flow through the XCONN/PAD circuit 76.

The BUSX module 86 interfaces with the FIM processor (not shown in FIG. 4) over an address/data/control ("A/D/C") bus 78 for configuration and control, and receives a clock signal 79. In a preferred embodiment, the clock signal 79 has a frequency of 12.288 MHz and the A/D/C bus 78 has sixteen bits of address, eight bits of data, and three control signal bits, including chip select and read/write, for a total of twenty-seven parallel bits wide. The A/D/C bus 78 allows the FIM processor to control and monitor the various modules of the XCONN/PAD circuit 36. The BUSX module 86 includes a bus timeslot counter 81, a BUSX state machine 94, and a loopback register block 96.

Incoming downstream data 82 to the BUSX module 86 is routed through a parity check/multiplexer 92 and sent through a multiplexer/demultiplexer circuit ("MUX/DEMUX") 98 to the loopback register block 96 and to downstream PCM and signalling data ports on the XMAM 90. Similarly, a MUX/DEMUX 100 passes upstream data 97 to the A/D/C bus 78 and the loopback register block 96 from upstream PCM and signalling data ports on the XMAM 90. The MUX/DEMUXes 132, 134, 108, 114, 110, 112, 130, 98, 100, 102, 104 thereby allow access to respective SRAM memories 83, 84, 85, 93 by the FIM processor for configuration and test. The bus timeslot counter 81 addresses a bus side timeslot type control memory (BTS_TYP) 84, and the data read from the BTS_TYP memory 84 is sent to the BUSX state machine 94. In addition, the bus timeslot counter 81 is stored as data during PCM timeslots to build the signalling timeslot lookup table in a bus signalling timeslot memory (BSIGTS) 85. The data from the signalling timeslot memory 85 is routed to the XMAM module 90 to address a downstream signalling memory ("DSIG_M") 87 and an upstream signalling memory ("USIG_M") 138.

The FIBX module 88 interfaces with the A/D/C bus 78 for configuration and control, and includes a fiber timeslot counter 91 and a FIBX state machine 106. In the FIBX module 88, the fiber timeslot counter 91 addresses the fiber control store memory ("FXM") 95 in the XMAM module 90, and the FXM data output of the XMAM module 90 sends control data and cross connect addresses to the FIBX state machine 106, which addresses a fiber signalling timeslot memory ("FSIGSTS") 93 with the signalling timeslot number (i.e., a "SIGNUM" field in the data from the FXM 95). The FSIGTS memory 93 receives data from the fiber timeslot counter 91, and addresses the DSIG_M 87 of the XMAM 90. The FIBX state machine 106 addresses upstream and downstream PCM memories 136, 99 and upstream and downstream signalling memories 138, 87 respectively, of the XMAM 90.

In the FIBFE module 77, a phase-frequency detector comprises part of a phase-locked loop 116 that, along with loop filter 60 (shown in FIG. 2), VCO 62 (shown in FIG. 2), and a digital divide by five circuit (not shown), generates a 61.44 MHz clock signal synchronized to the 12.288 MHz downstream bus clock signal 74. The FIBFE module 50 also includes a transmitted-data-byte processing block 118, a transmitted-data serial processing block 120, a FIBFE state machine 122, an electrical/optical (E/O) pulse shape controller block 124, a received-data-byte processing block 126, and a received-data serial processing block 128.

In the FIBFE module 77, downstream data from downstream cross connect memories ("DPCM_M and DSIG_M") 99, 87 in the XMAM 90 is sent via MUX/DEMUXes 130 and 134 to transmitted byte processing block 118 and then to transmitted serial data processing block 120. Upstream data received from an O/E circuit (not shown) is passed through received serial processing block 128 to received byte processing block 126, and then via MUX/DEMUXes 132 and 134 to upstream cross connect memories ("UPCM_M and USIG_M") 136, 138 in the XMAM 90. An electro-optical pulse shape block 124 generates control for the O/E circuitry. Data from the FXM 95 is input to the FIBFE state machine 122 to control FIBFE 77 circuitry.

The XMAM 90 coordinates accesses to a number of "virtual" multi-port memories, time-division multiplexing the accesses at a higher rate (30.72 MHz) than the bus clock signal 74 (12.288 MHz) into four single-port SRAM chips 83, which include the downstream PCM memory 99, the downstream signalling memory 87, the upstream PCM memory 136, the upstream signalling memory 138, and the FXM 95 (the fiber side cross-connect control store memory), which the XMAM 90 maps into four external SRAM memories ("XMEM") (not shown) located outside the XCONN/PAD circuit 36. In particular, the downstream and upstream PCM and signalling memories 99, 136, 87 and 138 each contain four pages (two for the expansion bus) of fifteen hundred thirty-six byte addresses, and the FXM 95 contains two pages of 960×24 bytes.

In the XMAM 90, the FXM 95 has an address port and a data port, wherein the address port communicates via MUX/DEMUX 110 with the FIBX module 88. The downstream and upstream PCM and signalling memories 99, 136, 87, and 138 each have left address and data ports and right address and data ports, respectively. In particular, the left address and data ports of the downstream PCM and signalling memories 99 and 87 each communicate with the BUSX module 86, respectively, and the right address and data ports each communicate with the FIBX module 88 and FIBFE module 50, respectively.

In a preferred embodiment, the XMAM module 90, which implements virtual XMEM memories in external SRAMs, receives bus and fiber access request, read/write, and address lines, a 12.288 MHz bus side clock signal, a 7.68 MHz fiber side clock signal, the A/D/C bus 78 from the processor, and a 30.72 MHz clock signal. Additionally, bus side data and fiber side data can be read from or written to the XMAM 90. The external memories have an address input that is driven only by the XMAM 90, and data can be read from or written to the external memories only through the XMAM 90.

In a presently preferred embodiment, the SRAMs comprise four single-port SRAMs. Access to the external memories through the XMAM 90 is time-division multiplexed among the various virtual memory ports of the XMAM 90 at a higher rate, i.e., 30.72 MHz. Because the virtual memory ports are all clocked at a rate that is divided down from the same clock, i.e., 61.44 MHz, accesses can be assigned timeslots at a rate of 30.72 MHz. In particular, bus accesses to the upstream and downstream PCM and signalling memories 87, 99, 136, 138 take two-fifths, fiber accesses one-fourth, FXM 95 accesses one-fourth (plus one-fourth to the external memories not accessed by the fiber side PCM and signalling ports), and FIM processor accesses one-tenth, respectively, of the cycles.

The FIM processor may also access the memories of the XMAM 90 in unused bus or fiber timeslots, e.g., during an overhead timeslot. Input data for all accesses to the XMAM 90 is registered in the XMAM 90 until the 30.72 MHz timeslot for the access port occurs, and outputs are available for fiber side data one 7.68 MHz cycle later and for bus side data one and one-half 12.288 MHz cycles later. Bus side data accesses can occur 12.288 million times each second and fiber side accesses can take place 7.68 million times per second. Multiple accesses of the virtual memories 80 are accomplished per bus side or fiber side clock cycle. In this way the XMAM 90, although implemented with single-port memories, functions effectively as a set of multi-port memories.

Figure 5:
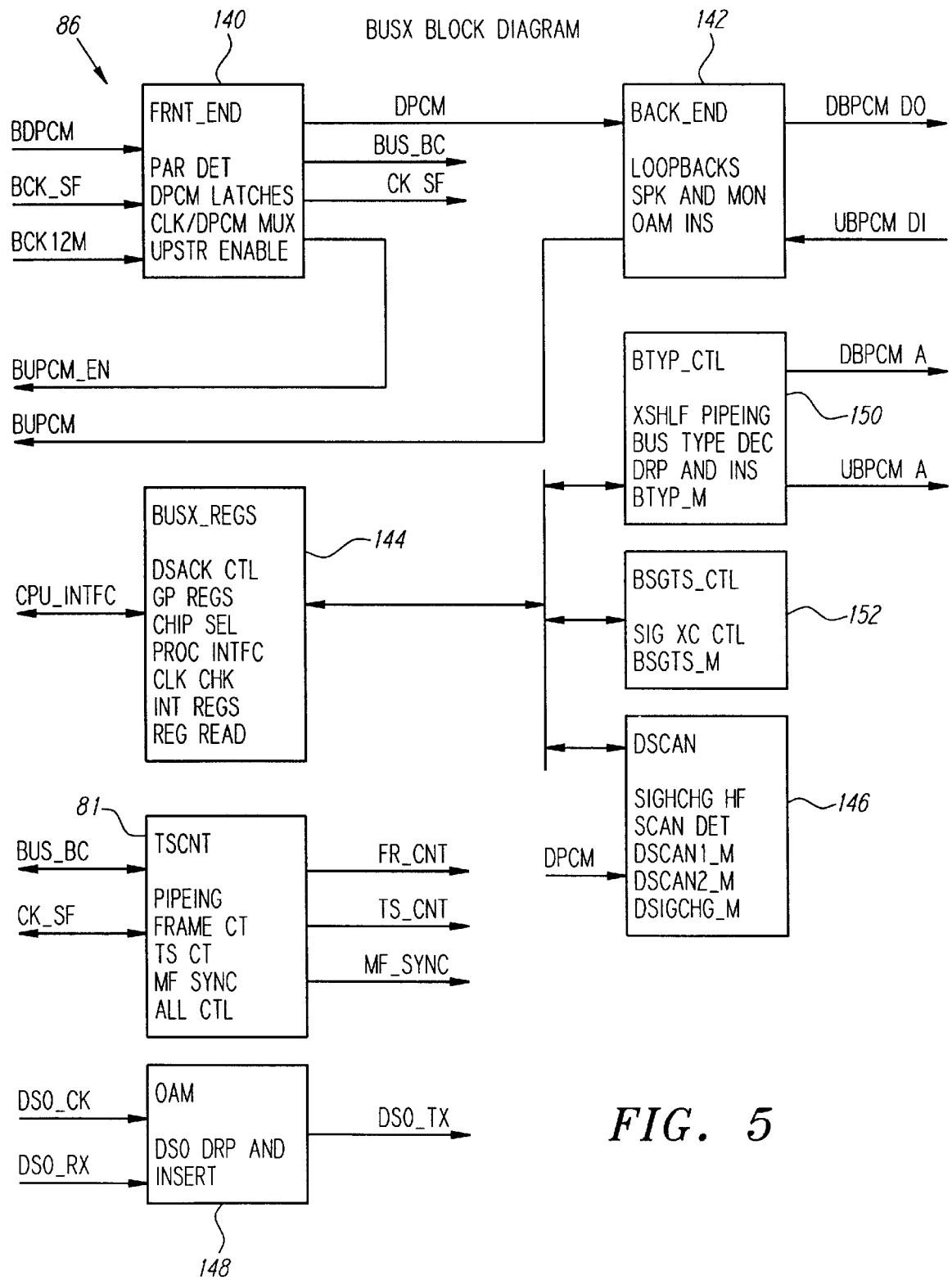
FIG. 5 is a block diagram of a preferred bus side cross-connect ("BUSX") module for use in the preferred XCONN/PAD circuit of FIG. 4.

Referring to FIG. 5, the BUSX module 86 includes a front-end block 140, which performs parity detection and multiplexing functions on the data. A back-end loopback block 142 performs loopbacks, i.e., sending downstream data back upstream for system testing. Bus side registers 144 interface with the FIM processor, and the bus timeslot counter 81 keeps track of the bus timeslot count within each frame. The BUSX module 86 also includes a block 146 that includes two downstream signalling scan memories and a downstream signalling scan change memory to enable downstream signalling scanning, as described in detail below. An operation and maintenance ("OAM") block 148 handles operation and maintenance channels of the system. A BTS_TYP controller 150 and a BSIGTS controller 152 control addressing, decoding, and data input/output for the BTS_TYP memory 84 and BSIGTS memory 85, respectively.

Figure 6:
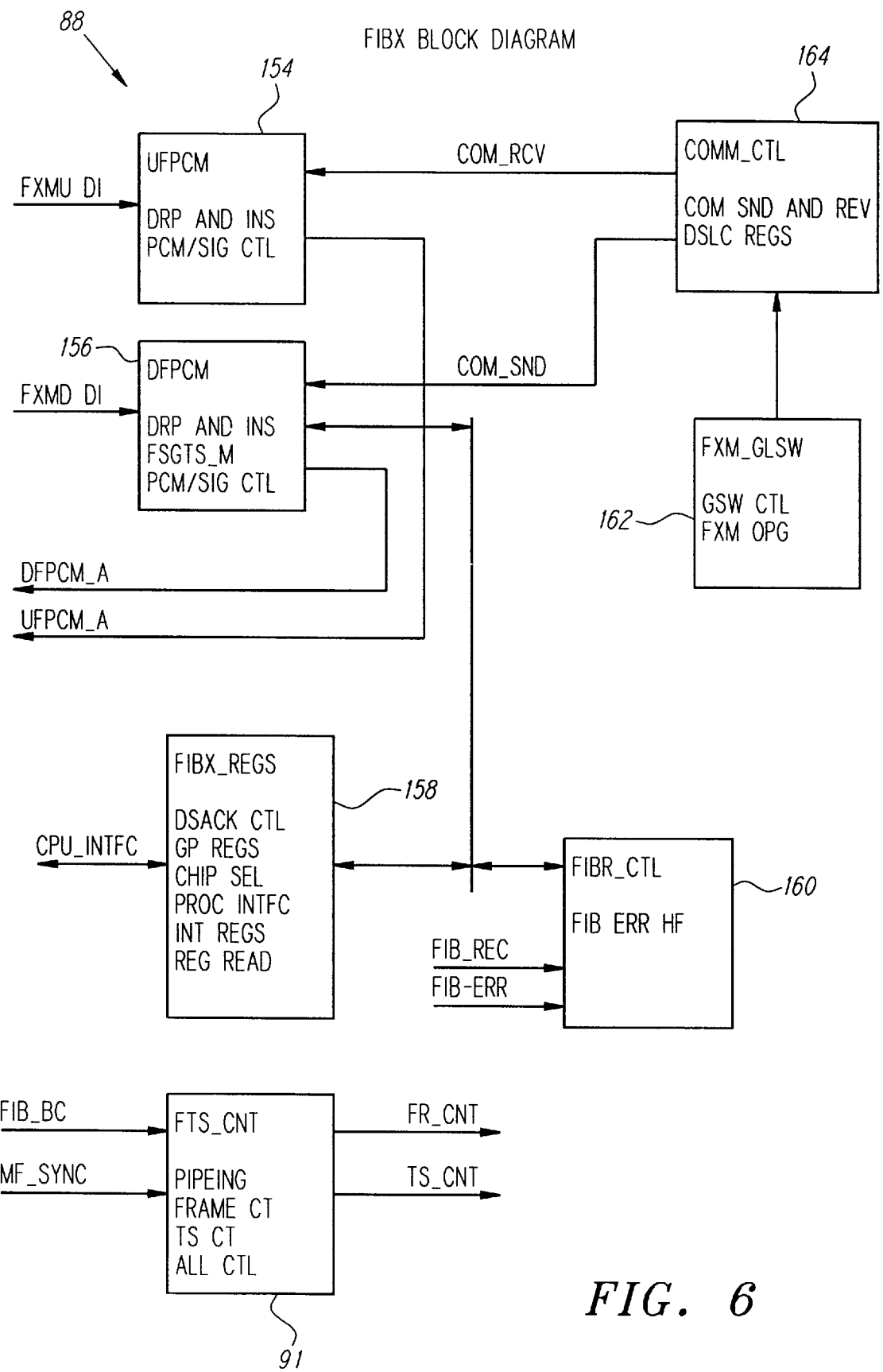
FIG. 6 is a block diagram of a preferred fiber side cross-connect ("FIBX") module for use in the XCONN/PAD circuit of FIG. 4.

Referring to FIG. 6, within the FIBX module 88, upstream and downstream fiber PCM blocks 154 and 156 receive, test, and route upstream and downstream data channels, respectively, from the UPCM_M 136 and the DPCM_M 99. A plurality of fiber side registers 158 are in communication with the FIM processor, and the fiber timeslot counter 91 keeps track of the fiber timeslot count within each frame. A half-FIFO 160, which stores data sequentially until full, but appears as a random access memory to the FIM processor, serves as a buffer to store fiber errors that accumulate too rapidly for the FIM processor to handle, is read from periodically by the FIM processor. Several types of ONU errors can occur, including, for example, missing packets, bad signalling, or parity errors. The half-FIFO 160 stores the error type and the timeslot number of the error. A fiber control store glitchless switching block 162 performs glitchless, or synchronous map, FXM 95 page switching, as discussed in detail below. A single COMM packet is sent and received in each frame from the FIM to the ONUs with the aid of a communication control block 164.

Figure 7:
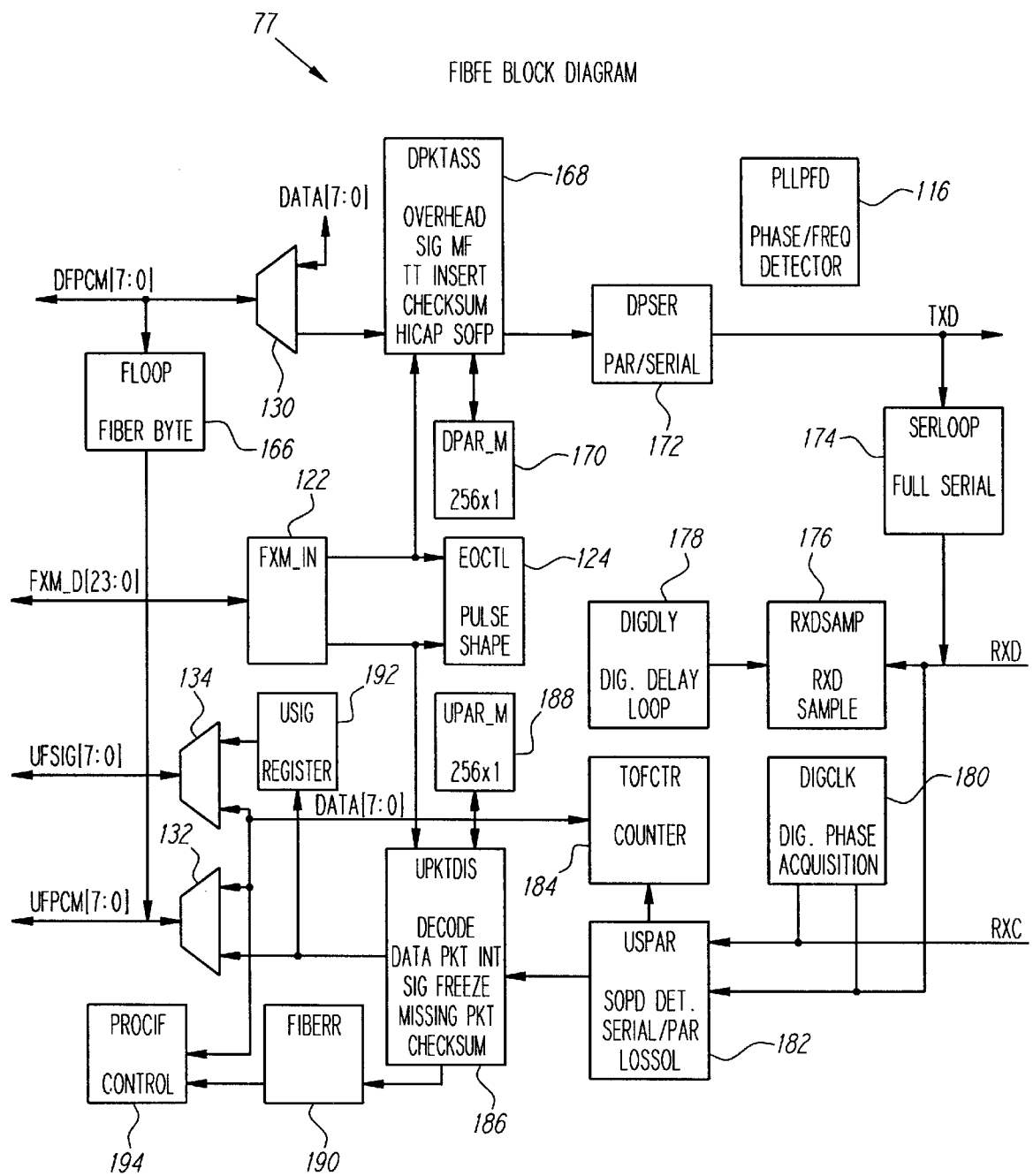
FIG. 7 is a block diagram of a preferred fiber front end ("FIBFE") module for use in the XCONN/PAD circuit of FIG. 4.

Referring to FIG. 7, within the FIBFE module 77, downstream data received from the downstream PCM memory 99 of the XMAM 90 is sent to a FLOOP register 166, which stores data contained in a downstream test channel identified in the FXM 95 to be sent back upstream for testing purposes. The downstream data is also sent through MUX/DEMUX 130 to a downstream packet assembly block 168. The downstream packet assembly block 168 assembles the data packets and inserts overhead, checksum, and (if under the T1 standard) TT bits, which identify which of three domestic variations of the T1 standard signalling is being used. A single-bit wide downstream data packet parity memory ("DPAR") 170 stores a parity bit for each data packet for transmission in the next frame, as controlled by the downstream packet assembly block 168. The downstream data is sent to a downstream parallel-to-serial converter 172 and then transmitted over the downstream serial interface 30 to the O/E circuit 38 (not shown in FIG. 7). The downstream data is also routed to a full serial loopback circuit 174, which may be selectively activated for sending the fiber side data stream back upstream for testing purposes.

The FIBFE state machine 122 decodes the data transmitted from the FXM 95 of FIG. 4 (i.e., after selecting data from page zero or page one of the FXM 95). The state machine 122 also receives control signals from the O/E pulse shape controller 124, which generates control signals for the O/E 38.

Upstream data is received from the O/E circuit 38 via the upstream serial interface 32 and sampled by a received-data-sampler ("RXDSAMP") 176 with an associated digital delay-locked loop ("DIGDLY") 178, which generates eight approximately equally spaced (in time) phases of the 61.44 MHz transmit clock. The loop is updated once per frame with an isolated training pulse inserted into the clock phases. The samples are synchronized and sent to a digital phase acquisition (i.e., clock recovery) circuit ("DIGCLK") 180, which acquires accurate phase for the received data by selecting the correct phase from among eight equally spaced (in phase) samples of the received data. Presently preferred embodiments of the RXDSAMP 176, DIGDLY 178, and DIGCLK 180 blocks are described more fully in U.S. patent application Ser. No. 08/787,849, entitled "Digital Phase Acquisition with Delay Locked Loop," filed Jan. 22, 1997, which is assigned to the assignee of the present application and which is fully incorporated herein by reference.

The recovered (and synchronized) upstream data channels are fed through an upstream serial-to-parallel converter 182, which communicates with a time-of-flight counter 184, which counts the time between transmission of a COMM packet sent to a given ONU and the received response of the ONU, thereby measuring the time of flight on the respective downstream and upstream fibers to each ONU. The different times-of-flight for each of the ONUs are preferably compensated for by adjusting individual transmission delays in each ONU, so that every COMM packet response comes back to the FIM at the same time in the upstream frame, although only one ONU transmits a COMM packet response in any given frame.

From the upstream serial-to-parallel converter 182, the upstream data is sent to a packet disassembly block 186, which decodes and disassembles the upstream data packets and "freezes" the signalling bytes if a data error or missing checksum is detected—i.e., the previous signalling data is retained and the corrupt signalling data is discarded. A single-bit upstream data packet parity memory ("UPAR") 188 stores data packet parity for verification in the next received frame under the control of the packet disassembly block 186. Additionally, a FIBERR block 190 detects fiber errors.

The recovered upstream PCM channels are routed, via control mux 132, to the respective upstream PCM and signalling memories 136 and 138 of the XMAM module 90. The upstream signalling channels are routed to an upstream signalling register 192, which stores the respective signalling channel bytes until they can be written into the upstream signalling memory 138, as described in greater detail below. In particular, the upstream signalling register 192 transmits the signalling channels to the upstream signalling memory 138 via a MUX/DEMUX 134.

The various internal memories included in the XCONN/PAD circuit 76 described in connection with FIGS. 4–7 are listed by name in FIG. 9, with size and functional description provided for each. Function of the XMAM module 90, which resides external to the XCONN/PAD circuit 76 and maps five "chunks" of virtual memory into four external XMEM memories, is now described in detail according to a presently preferred embodiment.

The four external memories of the XMAM 90 are organized as shown in tabular form in FIGS. 8A–D, which provide names, addresses, sizes, and descriptions of the contents of the respective memories. As can be seen, the fiber cross-connect memory (FXM) is distributed over all of the four external memories, which is necessary because the FXM requires more bandwidth than do the respective downstream and upstream PCM and signalling memories.

In particular, the first external memory ("XMEMA") includes the downstream PCM memory, the downstream signalling memory, and page zero of the low and high bytes of the FXM. The second external memory ("XMEMB") includes the upstream PCM memory, the upstream signalling memory, and page one of the low (bits seven to zero) and high bytes of the FXM. Similarly, the third and fourth external memories ("XMEMC") and ("XMEMD") include additional downstream and upstream PCM and signalling memories for the expansion bus as well as, respectively, pages zero and one of the middle (i.e., bits fifteen to eight) and high bytes of the FXM, which, in the depicted preferred embodiment, is twenty-four bits wide.

The high byte (i.e., bits twenty-three to sixteen) of the FXM is stored such that page zero is duplicated and contained in both the first and third virtual memories XMEMA and XMEMC, and is read from whichever one of the two memories is idle. Page one of the high byte of the FXM is likewise duplicated and contained in both the second and fourth virtual memories XMEMB and XMEMD, and is read from whichever one of the two memories is idle. Because each fiber timeslot may be cross-connected to either a channel on the main bus (resulting in accesses to XMEMA and XMEMB) or a channel on the expansion bus (resulting in accesses to XMEMC and XMEMD), one pair of XMEMs is always idle and available to read the high byte of the FXM.

Operation of the XCONN/PAD circuit 76 of FIG. 4 is now described in detail according to a presently preferred embodiment.

The downstream and upstream PCM memories are each divided into two pages and preferably duplicated, as discussed above in conjunction with FIGS. 8A–D, for expansion busses. While one page of the downstream PCM memory is written by the bus side cross-connect hardware, the other page is read by the fiber side cross-connect hardware. Switching of the pages takes place on frame boundaries. Data is stored at addresses corresponding to the bus timeslots. The downstream and upstream signalling memories are likewise each divided into two pages and duplicated for the expansion busses. While one page of the downstream signalling memory is written by the bus side cross-connect hardware, the other page is read by the fiber side cross-connect hardware. Page switching takes place on signalling multiframe boundaries, with signalling data stored at addresses corresponding to the associated PCM channel bus timeslots. The FIM hardware computes the associated PCM channel bus timeslot from the signalling timeslot and the frame number, as discussed below.

The FIMs can be programmably assigned to any of the backplane bus timeslots. Typically, the operator of the optical fiber communication network sets up a cross-connection between a channel on an E1 (or T1) interface from the switch to a channel in an ONU. Each E1 (or T1) channel is assigned to a fixed backplane timeslot, and the passive optical network that the ONU is connected to is terminated at a particular FIM. Therefore, firmware on that FIM must assign a fiber timeslot to a line card in a respective ONU and cross-connect the assigned fiber timeslot to the backplane timeslot. Each FIM clocks its downstream bus receivers and enables its upstream bus drivers only in timeslots that are assigned to that FIM. Each FIM also ignores downstream bus data and disables its upstream bus drivers in other timeslots.

In addition, to support a subscriber channel with signalling, the FIM must assign one frame (out of the sixteen or twenty-four frames in a signalling multiframe) of a fiber signalling timeslot to be associated with the fiber channel timeslot. The FIM must also cross-connect the correct frame of the fiber signalling timeslot to the correct frame of the backplane signalling timeslot that is associated with the backplane channel timeslot. Thus, for a signalling timeslot, the effective cross-connection changes for each frame in the signalling multiframe. Consequently, a different FIM may be assigned to each frame of a backplane signalling timeslot.

In a preferred embodiment, serial data traveling at 61.44 mbps is transmitted on separate upstream and downstream fibers between the respective FIMs and ONUs. Eight-bit wide fiber side timeslots are assigned semipermanently with the assignments repeated every frame at a frame rate of eight KHz. Thus, each timeslot forms a 64,000 bps channel. The same timeslot assignments are used on both the upstream and the downstream fibers. Data is scrambled on the fibers to reduce the probability of long sequences without transitions, thereby facilitating clock recovery from the data. Other fiber transmission speeds may be supported with modified FIMs.

Because each ONU has a different length of fiber running to it, with different sources of attenuation and different optical transmitters and receivers, some overhead data is needed at the beginning of each upstream ONU transmission to allow the FIM to recover timing and optical level from the received data. To minimize the number of overhead timeslots necessary, each ONU groups its transmissions into a packet so that all timeslots assigned to an ONU are contiguous in time and only one overhead sequence is needed per ONU.

Each ONU is assigned one or more signalling timeslots to carry signalling for associated channels in its packet. Each fiber signalling timeslot carries signalling for up to fifteen E1 (or twenty-four T1) subscriber channels. To facilitate mapping of fiber signalling timeslots to subscriber timeslots, each fiber signalling timeslot preferably precedes the associated subscriber timeslots in the packet. If more than one fiber signalling timeslot is carried in an ONU packet, i.e., to support more than fifteen channels in an ONU, then each fiber signalling timeslot carries signalling information for the subscriber timeslots that follow until the next signalling timeslot or the end of the packet.

For cross-connection of subscriber channels, bus side, or backplane, timeslot types can preferably be stored in a four-bit bus side control store memory referred to as BTS_TYP, which can be written or read by FIM firmware. A second bus side control store memory is used to store timeslot types for the expansion busses. Timeslot types that can be identified include INACTIVE (unused timeslot), VOICE (active voice, or PCM, channel in use by the FIM), DATA (active data channel, for example, to support ISDN service), SIG1 (first signalling timeslot), and SIG2 (second signalling timeslot associated with international (i.e., E1) standard voice channel timeslots 17–31). During VOICE or DATA timeslots, data from the downstream backplane bus is written into the main downstream cross-connect memory, using the timeslot number as the address, and data is read from the main upstream cross-connect memory, again with the timeslot number as the address. The data is driven onto the upstream backplane bus. During INACTIVE timeslots, no data is read or written to the downstream PCM and signalling memories, and the upstream bus drivers are disabled.

To cross-connect signalling channels, the timeslot number of the associated PCM channel is first determined given the signalling timeslot number and the frame number in the signalling multiframe. On the backplane side, signalling channels are directly addressed in the respective downstream and upstream signalling cross-connect memories by the timeslot number of the associated PCM channel. On the fiber side, signalling channels are addressed in the signalling memories by the backplane timeslot number to which the associated fiber channel is cross-connected. Thus, the signalling cross-connect memories can be implemented with the same number of addresses as the respective PCM cross-connect memories, instead of having to be sixteen times as large (or, for T1, twenty-four times as large). In addition, a row register includes a plurality of flip-flops (not all of which are used in T1 applications). The row register stores for each of the forty-eight (or thirty-two for T1) signalling timeslots whether the row may contain PCM channels.

If a signalling timeslot is active, signalling data from the downstream bus is written into the downstream signalling memory and signalling data is read from the upstream signalling memory and driven onto the upstream bus, respectively. If a signalling timeslot is not active during the frame for the FIM, no data is written into the downstream signalling memory and the upstream bus drivers are disabled.

In a presently preferred embodiment, backplane signalling is mapped to associated timeslots during signalling cross-connect by the bus signalling timeslot memory (BSIGTS). In particular, the BSIGTS memory and bus side state machine are used to store the timeslots that will be associated with signalling timeslots in the current frame. Given the timeslot number of a backplane signalling timeslot and the frame number in the signalling multiframe, the timeslot number of the associated timeslot can be determined because assignment of backplane timeslots is fixed. For example, in FIG. 10, which illustrates backplane timeslot assignment, the associated channels are all in the same column as the signalling timeslot. In frame number one, for example, the first timeslot (row number five) is associated with the first signalling timeslot (row number forty-six), and the seventeenth timeslot (row number twenty-six) is associated with the second signalling timeslot (row number forty-seven). In frame number two, the second PCM timeslot (row number six) is associated with the first signalling timeslot, and the eighteenth PCM timeslot (row number twenty-eight) is associated with the second signalling timeslot, and so on, up through frame number fifteen in the signalling multiframe. The associations repeat again in the next multiframe.

A backplane PCM row counter (not shown) in the BSGTS_CTL block 152 of FIG. 5 is reset at the start of each frame and increments at each row of bus side timeslots that may contain a PCM channel, as indicated by the associated flip-flops in the row register, which is written once at initialization by the FIM processor. A signalling frame counter is reset at the start of each signalling multiframe and increments at the start of each frame. When the state of the PCM row counter is equal to the signalling multiframe, the timeslot number of each active PCM channel is stored into the first row of the BSIGTS memory. When the state of the signalling row counter minus fifteen is equal to the signalling multiframe number, the timeslot number of each channel is stored into the second row of the BSIGTS memory. In a preferred embodiment, the first row of the BSIGTS memory is in the first thirty-two addresses of a 64×16 memory internal to an ASIC, and the second row of the BSIGTS memory is in the second thirty-two addresses of the same memory.

During the first row of signalling timeslots, the first row of the BSIGTS memory is read to retrieve the timeslot numbers of the associated channels. Similarly, during the second row of signalling timeslots, the second row of the BSIGTS memory is read. Signalling data is then written into the downstream signalling memory and read from the upstream signalling memory at the address equal to the timeslot number of the associated channel, which was read from the BSIGTS memory.

The bus timeslot counter addresses the BTS_TYP memory and identifies whether a bus timeslot is SIG, VOICE, UNUSED, etc., and whether the payload timeslot is active. The state machine stores the timeslot numbers of the channels that correspond to the signalling in the current frame in the BSIGTS memory. When a signalling timeslot occurs (always after the PCM timeslots), the associated timeslot is retrieved from the BSIGTS memory and the signalling data is read from the upstream signalling memory and written into the downstream signalling memory at the same address as its associated PCM timeslot.

In a preferred embodiment, fiber signalling is mapped to associated PCM timeslots during downstream signalling cross-connect by means of the fiber signalling timeslot memory (FSIGTS) memory. Fiber side signalling timeslots precede the associated fiber timeslots and are identified in the fiber cross-connect address control store, or fiber control store, memory (FXM). For each fiber channel, the FXM is programmed by the FIM processor with control and cross-connect information, to control the cross-connect circuitry.

The downstream signalling cross-connect hardware uses an approach that is similar to the above-described bus side signalling cross-connect approach. Specifically, the FXM entry for each signalling timeslot includes a unique signalling number (SIGNUM) that is used to address the FSIGTS memory. The FXM entry for each PCM timeslot includes the signalling frame number (SIGFR) that carries the channel's signalling in the preceding fiber signalling timeslot, as well as the backplane timeslot number to which the channel is cross-connected. When the SIGFR number from the FXM equals the signalling frame number plus one, the hardware state machine stores the backplane, or bus side, timeslot number of the channel in the FSIGTS memory at an address equal to the SIGNUM field from the FXM entry for the preceding signalling timeslot.

Put another way, the bus timeslot pointers for channels that will have signalling active in the next frame are stored in the FSIGTS memory. In the next frame, the FSIGTS memory is read during the signalling timeslot at the address equal to the SIGNUM field to get the bus timeslot number of the associated PCM channel. Signalling data (preceding the PCM channels) is then read from the downstream signalling memory at an address equal to the bus timeslot number where the associated PCM data was stored.

In sum, in the downstream data path, the fiber signalling timeslot memory (FSIGTS) is used to store the backplane timeslot number of the channel that will be associated with each fiber signalling timeslot in the next frame. When each fiber signalling timeslot occurs, the FSIGTS memory can be read to determine the associated channel backplane timeslot for the current frame. That timeslot number is then used to address the downstream signalling cross-connect memory to read the signalling data, which is then transmitted to the ONUs. In contrast, the upstream signalling cross-connect hardware is simpler, merely saving the signalling data for a few cycles. When a timeslot occurs with signalling active in the current frame, the signalling data is stored in a register while the data in the subsequent PCM timeslots is written to the upstream PCM memory. The saved signalling data is then written into the upstream signalling memory, at the address equal to the bus timeslot number of the associated PCM channel, at the next idle memory cycle, i.e., the next signalling or overhead timeslot.

In a preferred embodiment, the packet engine circuitry can be combined with the cross-connect circuitry because the FXM can identify a number of other timeslots besides merely PCM and signalling, and because the cross-connect circuitry can read and write fiber data and bus data at the appropriate rates to accommodate the differences in clock rates. Thus, OVERHEAD and COMM timeslots are used to control fiber packet assembly and communicate with hardware in the ONUs. Preferably, different timeslot types are identified by different values in a five-bit field in each FXM entry. Other bits in the FXM can then be used to hold information specific to the timeslot type programmed in the given location. In particular, the twelve-bit field to identify the backplane timeslot number to which fiber timeslots are cross-connected is used for several other packet-assembly purposes in other timeslot types. Thus, the same control store (i.e., the FXM) is used to control both the packet engine and the cross-connect circuitry, thereby reducing the memory required.

The FXM entry for OVERHEAD timeslots is also programmed by the FIM processor with the overhead pattern that is to be transmitted on the downstream fiber. The FIM processor uses the same bit field that holds the backplane timeslot numbers for payload timeslots. In this way, any needed overhead pattern can be generated and interspersed with payload timeslots. Data received from the upstream fiber in OVERHEAD timeslots is generally used to recover timing or optical signal level, and discarded by the packet engine.

The FXM entries for COMM timeslots are also programmed by the FIM processor, with pointers to communications buffers (DCOMM_M and UCOMM_M in XMEMA and XMEMB of FIG. 8A) used to exchange messages between the FIM and respective ONUs for configuration, performance monitoring and maintenance purposes. These pointers also use the same bits that hold the backplane timeslot number for payload timeslots.

An expansion backplane bus can preferably be used to increase the capacity of the optical fiber communication network from 1536 timeslots to 3072 timeslots. Thus, capacity can be doubled while the speed of the busses is maintained at 12.288 MHz. To avoid having to access the cross-connect memories at 24.576 MHz (i.e., at double speed), two sets of cross-connect memories are used: one set for the primary bus, and one set for the expansion bus. And two BTS_TYP memories are used, again one for the primary bus and one for the expansion bus. However, since each fiber timeslot is cross-connected to a backplane timeslot on either the primary or the expansion backplane bus, only one FXM is required. Preferably, a bit is added to the FXM to specify which of the two sets of cross-connect memories to cross-connect to each fiber channel. In an especially preferred embodiment, the expansion bus is paired with a redundant expansion bus. Thus, the expansion bus actually consists of a set of two upstream and two downstream busses. However, only one of the busses carries data at any given point in time.

In a presently preferred embodiment, telephone channels are concentrated to more efficiently use network resources. Concentration channels are provided from the switch up to the cross-connect memories. In this concentration configuration, channels are provided on the fiber for each end-user circuit. On the backplane busses, however, channels are provided only for end-user circuits that are in use (e.g., a circuit that is off-hook is in use). Inactive circuits on the fiber are assigned special inactive backplane timeslot numbers to which to perform dummy cross-connects. This allows signalling from inactive channels to be monitored to detect an end-user request to go active (i.e., for a circuit to go off-hook).

Failed channels or channels under test are preferably controlled by specifying the channel as active on either the backplane side or the fiber side, but not both. The desired idle and signalling data can then be written directly by the FIM processor into the primary cross-connect memories and signalling cross-connect memories. This feature can also be used to generate test patterns on inactive channels. There are two alternating pages in the cross-connect memories, and frame and signalling multiframe interrupts are provided. Therefore, the FIM processor can write to the page not currently in use, thereby giving adequate time to allow for interrupt latency.

In an especially preferred embodiment, signalling information is scanned by special-purpose hardware to reduce the FIM processor power needed to support conversions to message signalling, concentration, testing, and signalling translation. Signalling scanning can operate in a transparent mode, whereby signalling information is still transmitted through the cross-connect memories. Alternatively, signalling scanning can operate in a scan-and-insert mode, whereby signalling information is scanned and discarded, allowing the FIM processor to insert signalling into the cross-connect memories.

Signalling scanning state machines receive the current signalling state for each channel, compare the current state to the previous state and, if it is different, store the new state and channel number in a signalling change memory ("DSIGCHG," included in the downstream signalling scanning block 146 of the BUSX module 86, or "USIGCHG") for the FIM processor to read, and store the new state in a comparison memory ("DSCAN," also included in block 146), at the address corresponding to the associated PCM channel, for the next comparison. The volume of data and the required computations are kept to a minimum because only the changes in signalling states are stored in the DSIGCHG memory and read by the FIM processor.

A timestamp from a multiframe counter is recorded in the DSIGCHG memory with the first signalling change recorded in a signalling multiframe. Preferably, the timestamp is written into the USIGCHG memory before the first signalling change in each signalling multiframe. The timestamp is preferably fourteen bits long and counts absolute multiframes continuously from reset until wraparound. If no signalling changes in a signalling multiframe, no timestamp is recorded, thereby reducing the data that the FIM processor must process. The FIM processor uses the timestamp to determine which multiframe each of the signalling changes occurred in. The FIM processor likewise determines the new signalling state for each channel when the signalling changes. Thus, no signalling information is lost, even if the FIM processor falls behind in processing signalling change information for more than a full signalling multiframe.

If the DSIGCHG memory fills, the signalling scanning state machines cannot store any more signalling state changes. To avoid losing a state change, the signalling scanning state machines do not store the new signalling states in the comparison memory (DSCAN) for comparison to the states in the next multiframes. Instead, the previous signalling states are left in the comparison memory. In this way, when the FIM processor empties some of the DSIGCHG memory and changes can again be recorded, the signalling scanning state machines will compare against the most recent signalling state of which the processor was notified. Thus, no signalling states will be lost unless multiple signalling transitions occurred while the signalling change memory was full.

To allow signalling to be intercepted before it is written to the cross-connect memories, the downstream signalling scanning circuitry scans backplane signalling data. The upstream signalling scanning circuitry scans fiber signalling data before it is written to the cross-connect memories.

Preferably, upstream fiber side signalling timeslots are scanned for changes if scanning is enabled on the timeslot. Scanning is enabled on a given timeslot if a particular bit within the FXM is set and the timeslot has an active cross-connect. Scanning may be disabled by the FIM processor. The new signalling state is compared to the prior signalling state from an upstream signalling scan memory ("USCAN"). If the two are different, the timeslot number and new signalling state are stored in the USIGCHG memory. The new signalling state is then stored in the USCAN memory at the timeslot corresponding to the channel associated with the signalling.

Upstream scanning is performed on the fiber side before signalling data is written into the upstream signalling cross-connect memory, thereby allowing insertion of interpreted signalling data by the FIM processor. The preferred upstream scanning circuitry supports a scan-and-insert mode only, whereby signalling data is not written into the upstream signalling cross-connect memory. To achieve firmware-transparent upstream signalling scanning, the FIM processor writes each new signalling state into the upstream signalling cross-connect memory when the new signalling state is received from the USIGCHG memory.

The FIM processor can be maskably interrupted when the USIGCHG memory is nonempty at the end of a signalling multiframe, or immediately when the USIGCHG memory is half full. The nonempty interrupt occurs once per multiframe. The half-full interrupt allows firmware to read the USIGCHG memory more frequently so as to prevent saturation under high-traffic peaks. When the USIGCHG memory is full, new signalling states are not stored in the USCAN memory. Thus, when the USIGCHG memory is emptied, signalling transitions are not lost (with the exception, as discussed above, of multiple changes on the same channel before the USIGCHG memory is emptied).

The upstream signalling scanning circuitry could detect false changes, and even possibly miss a signalling state change, when fiber timeslots are moved. Only channels that move timeslots can be affected. A preferred method of compensating is to read the new signalling state for all channels that moved timeslots after completion of the FXM page switch. USIGCHG memory entries on those channels are then ignored for the duration of one multiframe. An alternative preferred method is to write the current signalling state into the new timeslot for each channel that will shift timeslots.

Downstream scanning is performed on timeslots on the primary bus with scanning enabled. Preferably, downstream scanning is not performed on the expansion bus. As in the upstream direction, signalling changes and a fourteen-bit timestamp are written into the DSIGCHG memory with the aid of downstream signalling scanning memories ("DSCAN1," "DSCAN2," included in block 146 of FIG. 5). Similar interrupts are provided, as for the upstream scanning hardware.

Preferably, one of three available downstream signalling scanning modes may be selected for each timeslot in the BTS_TYP bus side control store memory: transparent scan, scan-and-insert, or no scanning. Transparent scanning checks for signalling changes and notifies the FIM processor, and signalling data is also written into the downstream signalling cross-connect memory and transmitted to the ONUs. Scan-and-insert mode likewise notifies the FIM processor of signalling changes, but signalling data is not written into the downstream signalling cross-connect memory. Instead, the FIM processor writes interpreted signalling data into the downstream signalling cross-connect memory after each signalling change.

In a preferred embodiment, a single parity bit is used to detect errors in fiber payload packets. This bit precedes the data packet as the last bit in a multipurpose header byte used to establish timing, signal an interrupt request, and identify the byte boundary of the packet. Putting the parity bit in the preceding multipurpose overhead byte, rather than in a byte at the end of the packet, minimizes the number of overhead timeslots needed per fiber payload packet.

Because the parity bit precedes the packet, the parity bit is actually the parity computed on the data in the packet sent in the previous frame. The packet engine has a single bit of memory (DPAR, designated block 170 in FIG. 7) for each ONU in which the packet engine stores the parity computed on each data packet until the next frame. At the beginning of each data packet, the parity computed on the data packet in the previous frame is retrieved. The FXM contains a unique ONUID number for each ONU. The ONUID number is used to address the parity bit memory (DPAR). (A second parity bit memory (UPAR, designated block 188 in FIG. 7) is similarly used for upstream data.)

Preferably, the XCONN/PAD circuit can prevent glitches or loss of data when the addition or deletion of channels (e.g., to increase the size of a packet sandwiched between several other packets) causes the fiber timeslots of other channels to be reassigned. First, when fiber timeslots must be reassigned, the change must be synchronized with the ONUs. Second, the data stored in the FSIGTS memory and parity bit memories (DPAR, UPAR) must still be addressed correctly with the new fiber timeslot assignment.

To synchronize fiber timeslot changes with the ONUs, downstream fiber data is first transmitted with the new fiber timeslot assignment. Next, the ONUs are commanded to switch to the new fiber timeslot assignment in the frame in which the ONUs start receiving the new assignment. The FIM switches the upstream part of the packet engine, or PAD, circuit (i.e., the packet disassembly portion) to use the new fiber timeslot assignment in the frame in which the FIM starts receiving upstream data from the ONUs with the new timeslot assignment. This switch can occur up to several frames after the FIM started transmitting the new assignment on the downstream fiber.

The XCONN/PAD circuit is controlled by a single fiber control store memory (the FXM) with two pages: an active (i.e., online) page and an offline page. Each FXM page contains a location corresponding to each fiber side timeslot. To synchronize a fiber timeslot switch with the ONUs, the FIM processor programs the offline page of the FXM with the new timeslot assignment. The FIM processor then sends communications messages to the ONUs to set up the new timeslot assignment in their offline timeslot maps. Finally, the FIM processor commands the FIM hardware to perform a synchronous map switch. The prior offline page of the FXM is used first by the downstream (i.e., packet assembly) portion of the PAD circuit. At the same time, the prior online page of the FXM is still used by the upstream (i.e., packet disassembly) portion of the PAD circuit. Several frames later the upstream portion of the PAD circuit stops using the prior online bank of the FXM. The switch is then complete, and the prior offline page of the FXM has become the current online page of the FXM.

Preferably, the FIM synchronizes downstream FXM control store switches to two frames before the start of a signalling multiframe. The FIM preferably has a programmable delay of between zero and seven frames from a time two frames before the start of the signalling multiframe to the time of the downstream FXM switch. A similar programmable delay is advantageously provided from the time two frames before the start of the signalling multiframe to the time that the COMM packet containing the map switch command for the ONUs is transmitted to the ONUs. Preferably, another similar programmable delay is provided from the time two frames before the start of the signalling multiframe to the time of the upstream FXM switch.

In an especially preferred embodiment, the North American standard for ISDN over T1 is supported. This requires each D timeslot to contain two bits from each of four sixteen-kilobit-per-second D channels. Downstream, two-bit D channels from the T1 interface are collected over four frames in the ETM module and sent once every four frames to the FIM as a full byte for each channel. Four channels share one timeslot in a four-frame multiframe. The data from each timeslot is stored in both pages of the signalling cross-connect memory and both pages of the PCM cross-connect memory, addressed by two bits of frame number and the timeslot number. Downstream ISDN D-channel data is read from the cross-connect memories at a D-channel address that is contained in the two associated B-channel entries in the control store memory (FXM). As will be apparent from the present disclosure, upstream operation is substantially similar.

In order to provide a still more further detailed description of a presently preferred embodiment of the above-described XCONN/PAD circuit, the following verilog design code is provided:

```
1   //-------------- bsgts column counter 5 bytes early -------------------------------
                    // count columns int'l (32), domestic (48), five bytes early,
                    // reset on early frame sync or at early terminal column count
            wire [5:0]colm_ct;
5           wire       tm_colm_ct = intl_domn ? (colm_ct == 6'd31) : (colm_ct == 6'd47);
            wire [5:0]colm_ct_di = 6'd0;
            wire       colm_ct_en = 1'b1;
            wire       colm_ct_ld = ~frsync_d_n | tm_colm_ct;
            CTR6 colm_ct_ctr(colm_ct,colm_ct_di,bus_bc,colm_ct_en,colm_ct_ld,rst_n);
10  //-------------- bsgts row counter 5 bytes early ---------------------------------
                    // count rows, international (48), domestic (32), five bytes
                    // early, enable at terminal column count, reset at early
                    // frame sync or terminal row count
            wire [5:0]row_ct;
15          wire       tm_row_ct = tm_colm_ct &
                       (intl_domn ? (row_ct == 6'd47) : (row_ct == 6'd31));
            wire [5:0]row_ct_di = 6'd0;
            wire       row_ct_en = tm_colm_ct;
            wire       row_ct_ld = ~frsync_d_n | tm_row_ct;
20          CTR6 row_ct_ctr(row_ct,row_ct_di,bus_bc,row_ct_en,row_ct_ld,rst_n);
                    // row_ct_early is one byte early of row_ct, to pipeline
                    // pcm_row for bsgts_wen path delay minization
            /* wire [5:0] row_ct_early = (intl_domn ? row_ct == 6'd47 : row_ct == 6'd31) ?
            6'd0 : row_ct + 6'd1;  */
25          wire [5:0] row_ct_early = row_ct_ld ? row_ct_di :
              (row_ct_en ? row_ct + 6'd1 : row_ct);
                       // pcm_row_d indicator is one of the 48(32) taps on the pcm
                       // row register and is 1 row and 5 bytes early
            // wire     pcm_row_d = pcm_r[row_ct];
30          wire       pcm_row_d = pcm_r[row_ct_early];
                       // pcm_row indicator register
```

```
1   DFF_R pcm_row_reg(pcm_row,pcm_row_d,bus_bc,rst_n);
    //-------------- pcm row counter 5 bytes early ---------------------------------
                    // count pcm rows, international (15), domestic (23), five bytes
                    // early, enable if pcm_row and terminal column count, and
5                   // pcm_row_ct_done clear, reset international (1), domestic (0),
                    // if early frame sync or terminal pcm_row_ct
    wire        pcm_row_ct_done;
    wire [4:0]pcm_row_ct;
    wire        tm_pcm_row_ct = pcm_row & tm_colm_ct &
10              (intl_domn ? (pcm_row_ct == 5'd15) : (pcm_row_ct == 5'd23));
    wire [4:0]pcm_row_ct_di = intl_domn ? 5'd1 : 5'd0;
    wire        pcm_row_ct_en = pcm_row & tm_colm_ct & ~pcm_row_ct_done;
    wire        pcm_row_ct_ld = ~frsync_d_n | tm_pcm_row_ct;
    CTR5
15  pcm_row_ctr(pcm_row_ct,pcm_row_ct_di,bus_bc,pcm_row_ct_en,pcm_row_ct_ld,rst_n
    );
    wire [4:0] pcm_row_ct_early = pcm_row_ct_ld ? pcm_row_ct_di :
    (pcm_row_ct_en ? pcm_row_ct + 5'd1 : pcm_row_ct);
    /*
20                  // pcm row count early is one row and 5 bytes early of pcm row
    count
    wire [4:0] pcm_row_ct_early = (intl_domn ? pcm_row_ct == 5'd15 : pcm_row_ct ==
    5'd23) ?
    5'd0 : pcm_row_ct + 5'd1;
25  */
                    // frame match early
    wire fr_match_d = pcm_row_ct_early == frcnt_d_d;
                    // frame match register
    DFF_R fr_match_reg (fr_match,fr_match_d,bus_bc,rst_n);
30  //-------------- bsgts active signalling detection -----------------------------
                    // set when intl first 15 pcm rows are counted, or domestic
```

```
1                  // all 24 pcm rows are counted, reset at begining of frame,
                   // all done 5 bytes early
        JKFFR sig1_row_done_reg(sig1_row_done,tm_pcm_row_ct,bus_bc,~frsync_d_n,rst_n);
                   // non-scan pcm timeslot indicator
5       wire pcm_ts = pcm | monpcm | monitor;
        wire pcmx_ts = pcmx | monpcmx | monitorx;
                   // signalling active when the row is a pcm row
                   // and there is an active pcm provisioned in that row
                   // (as opposed to rides, data, etc.) and that pcm gets
10                 // cross-connected in the current frame all determined five
                   // bytes early
        wire sig_act = pcm_row & pcm_ts & (fr_match);
        wire sigx_act = pcm_row & pcmx_ts & (fr_match);
        wire scant_act = pcm_row & pcm_scant & (fr_match);
15      wire scani_act = pcm_row & pcm_scani & (fr_match);
                   // status bits that get written to bsgts memory
        wire [3:0] act_stat = {sigx_act,sig_act,scant_act,scani_act};
                   // save frame number of active pcm timeslot always
                   // when in domestic and only in international when
20                 // pcm_row_ct <= 15 (~sig1_row_done)
        wire act_row_sig1_en = |act_stat[2:0] & (~intl_domn | (intl_domn & ~sig1_row_done));
        DFF_RE5 act_row_sig1_reg(act_row_sig1,frcnt_d,bus_bc,act_row_sig1_en,rst_n);
                   // save frame number during an active pcm timeslot
                   // when in international mode and pcm_row_ct > 15
25      (sig1_row_done)
                   // which means no sig1 pcms left
        wire act_row_sig2_en = |act_stat[2:0] & intl_domn & sig1_row_done;
        DFF_RE5
        act_row_sig2_reg(act_row_sig2,{1'b1,frcnt_d[3:0]},bus_bc,act_row_sig2_en,rst_n);
30      //--------------- bsgts memory controller ----------------------------------
        wire [15:0] bsgts_do;// bsgts memory data output
```

59

```
1    wire [7:0] dataih_q;// latched high byte of bsgts memory input
                    // set when intl 2nd 15 pcm rows are counted or domestic, when
                    // all 24 pcm rows are counted, clear bit at start of next frame
     wire pcm_row_ct_done_j = ~pcm_row_ct_done & tm_pcm_row_ct &
5    (~intl_domn | (intl_domn & sig1_row_done));
                    // pcm row count done register
     JKFFR
     pcm_row_ct_done_reg(pcm_row_ct_done,pcm_row_ct_done_j,bus_bc,~frsync_d_n,rst_
     n);
10                  // signalling row indicators, one byte early of upstream ts
     wire sig1_row = sig1 | sigx1;
     wire sig2_row = sig2 | sigx2;
                    // international mode the bsgts memory get addressed by
                    // the lower 5 bits of the column counter (0->31) and switches
15                  // to upper 32 btyes when the pcm row count counts to 15
                    // when the pcm row count counts to 15 a second time,
                    // the address is generated by
                    // the lower 5 bits of the column counter (0->31) and the upper
                    // 32 bytes of memory are selected when a sig2 timeslot is active
20   wire [5:0] intl_a = pcm_row_ct_done ? {sig2_row,colm_ct[4:0]} :
     {sig1_row_done,colm_ct[4:0]};
                    // domestic mode bsgts memory addressed by column counter(0-
     >47)
     wire [5:0] dom_a = colm_ct;
25                  // write the bsgts memory whenever there is an active pcm
                    // row and the pcm row count is not
                    // complete, this will allow overwriting of previous active
                    // channels with inactive, and will write new active status
                    // except for frame zero intl mode
30   //wire hw_wr = ~pcm_row_ct_done & pcm_row & (fr_match);
     wire hw_wr = ~pcm_row_ct_done & pcm_row & fr_match;
```

60

```
 1                    // enable active status read when pcm row count done
                      // and a signalling timeslot is encountered and the there is an
                      // active signalling frame since it is possible in intl mode to
                      // have an inactive pcm frame in frame 0, intl
 5      wire hw_rd = pcm_row_ct_done & (sig1_row | sig2_row);
                      // access to bsgts memory by hardware, indicator
        assign bsgtshw_csn = ~(hw_wr | hw_rd);
                      // allow processor access when no active read or write to the
                      // bsgts memory, and there is a valid chip select
10      wire proc_en = ~bsgts_csn & ~(hw_wr | hw_rd);
                      // processor access read, when processor enabled and rw_n high
        wire proc_rd = proc_en & rw_n;
                      // select processor addres when processor enabled else select
                      // international or domestic state machine address
15      wire [5:0] bsgts_a = proc_en ? addr[6:1] : (intl_domn ? intl_a : dom_a);
                      // low byte access at high address
        wire proc_wr_l = (addr[0] & proc_en & ~rw_n);
                      // high byte access at low address
        wire proc_wr_h = (~addr[0] & proc_en & ~rw_n);
20                    // high byte write access or read access
                      // accesses full 16 bits
        wire bsgts_m_csn_d = ~(proc_wr_l | proc_rd | hw_wr | hw_rd);
                      // bsgts memory chip select register
        DFF_P bsgts_csn_del(bsgts_m_csn,bsgts_m_csn_d,bus_bcq_n,rst_n);
25                    // latch high byte of 16 bit write
        DFF_RE8 bsgts_di_high_reg (dataih_q,datai,bus_bc,proc_wr_h,rst_n);
                      // write bsgts data if processor write to high byte
                      // or active channel
        wire bsgts_wen_d = ~(proc_wr_l | hw_wr);
30                    // bring wen low one quarter cycle after rising edge
                      // of bus_bc to allow for 3.41 nsec of hold time
```

```
1                        // necessary for st(-)=>rwb(-) in the case of read then write
        DFF_P bsgts_wen_del(bsgts_wen,bsgts_wen_d,bus_bcq_n,rst_n);
                         // store timeslot number of active pcm timeslot in bsgts memory,
                         // or zeros if inactive timeslot
5       wire [10:0] bsgts_dat = (~pcm_row_ct_done & lact_stat) ? (xshlf ? tscnt_q : tscnt_q3) :
        11'b0;
                         // cpu data input or hw data input
        wire [15:0] bsgts_di = proc_en ? {dataih_q,datai} : {1'b0,act_stat,bsgts_dat};
                         // processor access 8 bit mux data output
10      wire [7:0] bsgts_dout_d = addr[0] ? bsgts_do[7:0] : bsgts_do[15:8];
                         // cpu access latched 8 bit data output
        DFF_RE8 bsgts_cpu_dout_reg(bsgts_dout_q,bsgts_dout_d,bus_bc,proc_rd,rst_n);
                         // frame zero intl mode gets inactive status
        wire [15:0] bsgts_do_d = (frcnt_d == 5'd0 & intl_domn) ? 16'd0 : bsgts_do;
15                       // hw access latched data output register
        DFF_RE16 bsgts_hw_do_reg(bsgts_do_q,bsgts_do_d,bus_bc,hw_rd,rst_n);
                         // output enable on active read or processor access read
        wire bsgts_oe = hw_rd | proc_rd;
                         // always output enable memory
20      wire bsgts_oen = 1'b0;
        wire bsgts_st = (bsgts_oe & ~bus_bc) | // read strobe for 2nd half cycle
        (~bsgts_wen & ~bus_bc & ~bus_bcq_log);// write strobe for 3rd quarter cycle
        //------------------- bsgts memory -------------------------------------
                         // bus signalling timeslot memory holds 11 bit
25                       // timeslot of signalling cross connect and 4 bit
                         // active status of timeslot
        wire BOEB = 1'b0;
        assign BDBO[36:21] = bsgts_do;
                         // 64 x 16 memory
30      RA0006401612 _RA0006401612
        (.DBO0(bsgts_do[0]),.DBO1(bsgts_do[1]),.DBO2(bsgts_do[2]),
```

```
1       .DBO3(bsgts_do[3]),.DBO4(bsgts_do[4]),.DBO5(bsgts_do[5]),.DBO6(bsgts_do[6]),
        .DBO7(bsgts_do[7]),.DBO8(bsgts_do[8]),.DBO9(bsgts_do[9]),.DBO10(bsgts_do[10]),
        .DBO11(bsgts_do[11]),.DBO12(bsgts_do[12]),.DBO13(bsgts_do[13]),
        .DBO14(bsgts_do[14]),.DBO15(bsgts_do[15]),
5       .A0(bsgts_a[0]),.A1(bsgts_a[1]),.A2(bsgts_a[2]),
        .A3(bsgts_a[3]),.A4(bsgts_a[4]),.A5(bsgts_a[5]),
        .DBI0(bsgts_di[0]),.DBI1(bsgts_di[1]),.DBI2(bsgts_di[2]),.DBI3(bsgts_di[3]),
        .DBI4(bsgts_di[4]),.DBI5(bsgts_di[5]),.DBI6(bsgts_di[6]),.DBI7(bsgts_di[7]),
        .DBI8(bsgts_di[8]),.DBI9(bsgts_di[9]),.DBI10(bsgts_di[10]),.DBI11(bsgts_di[11]),
10      .DBI12(bsgts_di[12]),.DBI13(bsgts_di[13]),.DBI14(bsgts_di[14]),
        .DBI15(bsgts_di[15]),.ST(bsgts_st),.BSB(BSB),.RWB(bsgts_wen),.OEB(bsgts_oen),
        .CSB(bsgts_m_csn),.BA0(BA[0]),
        .BA1(BA[1]),.BA2(BA[2]),.BA3(BA[3]),.BA4(BA[4]),.BA5(BA[5]),
        .BDBI0(BDBI[21]),.BDBI1(BDBI[22]),
15      .BDBI2(BDBI[23]),.BDBI3(BDBI[24]),.BDBI4(BDBI[25]),.BDBI5(BDBI[26]),
        .BDBI6(BDBI[27]),.BDBI7(BDBI[28]),.BDBI8(BDBI[29]),
        .BDBI9(BDBI[30]),.BDBI10(BDBI[31]),.BDBI11(BDBI[32]),.BDBI12(BDBI[33]),
        .BDBI13(BDBI[34]),.BDBI14(BDBI[35]),.BDBI15(BDBI[36]),
        .BST(BST),.BRWB(BRWB),.BOEB(BOEB),.BCSB(BCSB));
20      //---------------- pcm/sig address generation ----------------------------
                // drive downstream signalling during a sig1 or sig2 timeslot
                // if normal signalling or scant signalling active
        wire d_act_sig = (ld_act_stat[2:1]) & (d_sig1 | d_sig2);
        wire d_act_sigx = d_act_stat[3] & (d_sigx1 | d_sigx2);
25              // act_stat = {sigx_act,sig_act,scant_act,scani_act};
                // early determination of downstream active signalling to minimize
                // path on dbpcm_wen
        wire d_act_sig_d = (ld_act_stat_early[2:1]) & (d_sig1_d | d_sig2_d);
        wire d_act_sigx_d = d_act_stat_early[3] & (d_sigx1_d | d_sigx2_d);
30              // drive upstream signalling during scant,scani or normal
                // signalling cross-connect
```

63

```
1       wire u_act_sig = (!u_act_stat[2:0]) & (u_sig1 | u_sig2);
        wire u_act_sigx = u_act_stat[3] & (u_sigx1 | u_sigx2);
                        // early determination of upstream active signalling to minimize
                        // path on ubpcm_oen, only valid during bsgts hardware read
5       wire u_act_sig_d = (!u_act_stat_early[2:0]) & (u_sig1_d | u_sig2_d);
        wire u_act_sigx_d = u_act_stat_early[3] & (u_sigx1_d | u_sigx2_d);
                        // valid bus test timeslot when btest active
                        // and bus drop and insert has started
        wire v_d_btest = ~btst_x & d_btest & d_btst_strt;
10      wire v_d_btestx = btst_x & d_btestx & d_btst_strt;
        wire v_u_btest = ~btst_x & u_btest & u_btst_strt;
        wire v_u_btestx = btst_x & u_btestx & u_btst_strt;
                        // valid bus test timeslot when btest active
                        // and bus drop and insert has started, one cycle early
15      wire v_d_btest_d = ~btst_x & d_btest_d & d_btst_strt;
        wire v_d_btestx_d = btst_x & d_btestx_d & d_btst_strt;
        wire v_u_btest_d = ~btst_x & u_btest_d & u_btst_strt;
        wire v_u_btestx_d = btst_x & u_btestx_d & u_btst_strt;
                        // downstream signalling or pcm indicator, high if sig1 or
20                      // sig2 timeslot or if isdn_d4 timeslot and the isdn cross
                        // connect frame is 2 or 3, else low
        wire dsig_pcm = d_sig1 | d_sig2 | (d_isdn_d4 & d_isdn_fr[1]);
        wire dsig_pcmx = d_sigx1 | d_sigx2 | (d_isdn_d4x & d_isdn_fr[1]);
                        // upstream signalling or pcm indicator
25      wire usig_pcm = u_sig1 | u_sig2 | (u_isdn_d4 & u_isdn_fr[1]);
        wire usig_pcmx = u_sigx1 | u_sigx2 | (u_isdn_d4 & u_isdn_fr[1]);
                        // downstream page indicator, high if isdn_d4 timeslot and
                        // the isdn cross connect frame is 1 or 3, else high
                        // if sig_al1 or dpcm_al1 bits are high, else low
30      wire dpage = d_isdn_d4 ? d_isdn_fr[0] : (dsig_pcm ? dsig_al1 : dpcm_al1);
        wire dpagex = d_isdn_d4x ? d_isdn_fr[0] : (dsig_pcmx ? dsig_al1 : dpcm_al1);
```

64

```
 1                    // upstream page indicator
       wire upage = u_isdn_d4 ? u_isdn_fr[0] : (usig_pcm ? usig_a11 : upcm_a11);
       wire upagex = u_isdn_d4x ? u_isdn_fr[0] : (usig_pcmx ? usig_a11 : upcm_a11);
                      // downstream bus pcm address, is bus test address if
 5                    // a valid bus test timeslot, else is signalling cross connect
                      // address if timeslot is active signalling, else is pcm address
       assign dbpcm_a = v_d_btest ? {btst_bse[6:0],d_cnt_btst[5:0]} :
       (d_act_sig ? {dsig_pcm,dpage,d_xcsig_a} : {dsig_pcm,dpage,d_pcm_a});
                      // downstream expansion bus pcm address
10     assign dbpcmx_a = v_d_btestx ? {btst_bse[6:0],d_cnt_btst[5:0]} :
       (d_act_sigx ? {dsig_pcmx,dpagex,d_xcsigx_a} : {dsig_pcmx,dpagex,d_pcm_a});
                      // upstream bus pcm address
       assign ubpcm_a = v_u_btest ? {btst_bse[6:0],u_cnt_btst[5:0]} :
       (u_act_sig ? {usig_pcm,upage,u_xcsig_a} : {usig_pcm,upage,u_pcm_a});
15                    // upstream expansion bus pcm address
       assign ubpcmx_a = v_u_btestx ? {btst_bse[6:0],u_cnt_btst[5:0]} :
       (u_act_sigx ? {usig_pcmx,upagex,u_xcsigx_a} : {usig_pcmx,upagex,u_pcm_a});
       //-------------- pcm/sig write enables/output enables --------------------------
                      // dbpcm write enable d input, pipelined to minimize
20                    // delay on path to xmam
       wire dbpcm_wen_d =
       ~(d_pcm_d|d_pcm_scant_d|d_pcm_scani_d|d_monpcm_d|d_sloop_d|
       d_data_d|d_isdn_d4_d|v_d_btest_d|d_act_sig_d);
                      // dbpcm write enable register
25     DFF_P dbpcm_wen_reg (dbpcm_wen,dbpcm_wen_d,bus_bc,rst_n);
                      // dbpcmx write enable d input, pipelined to minimize
                      // delay on path to xmam
       wire dbpcmx_wen_d = ~(d_pcmx_d|d_monpcmx_d|d_sloopx_d|d_datax_d|d_isdn_d4x_d|
       v_d_btestx_d|d_act_sigx_d);
30                    // dbpcmx write enable register
       DFF_P dbpcmx_wen_reg (dbpcmx_wen,dbpcmx_wen_d,bus_bc,rst_n);
```

65

```
1                   // dbpcmx write enable d input, pipelined to minimize
                    // delay on path to xmam
        wire ubpcm_oen_d =
        ~(u_pcm_d|u_pcm_scant_d|u_pcm_scani_d|u_monpcm_d|u_sloop_d|
5       u_data_d|u_isdn_d4_d|v_u_btest_d|u_act_sig_d);
                    // ubpcm output enable register
        DFF_P ubpcm_oen_reg (ubpcm_oen,ubpcm_oen_d,bus_bc,rst_n);
                    // ubpcmx output enable d input, pipelined to minimize
                    // delay on path to xmam
10      wire ubpcmx_oen_d = ~(u_pcmx_d|u_monpcmx_d|u_sloopx_d|u_datax_d|u_isdn_d4x_d|
        v_u_btestx_d|u_act_sigx_d);
                    // ubpcm output enable register
        DFF_P ubpcmx_oen_reg (ubpcmx_oen,ubpcmx_oen_d,bus_bc,rst_n);
        endmodule
15      //--------------- upstream pcm/isdn address -----------------------------
                    // upstream pcm address compensated for xshlf
                    // there is a three timeslot difference between
                    // upstream and downstream timeslots, 2 for upstream
                    // memory access and 1 for downstream data latch
20      assign u_pcm_a = xshlf ? tscnt_q2 : tscnt_q4;
        assign d_pcm_a = tscnt_q7;
                    // upstream isdn cross connect frame compensated for xshlf
        assign u_isdn_fr = frcnt_q[1:0];
        assign d_isdn_fr = xshlf ? frcnt_q6[1:0] : frcnt_q4[1:0];
25      //-------- downstream pcm/sig page switching bit, 1 byte ahead --------
                    // dpcm_a11 bit toggles every frame and starts at 1,
                    // and at multiframe boundary its set to 1
        wire dpcm_a11_d = mfsync_n ? ~dpcm_a11 : 1'b1;
        wire dpcm_a11_en = (tscnt_q7 == 11'd1535);
30      DFF_PE dpcm_a11_ctr (dpcm_a11,dpcm_a11_d,bus_bc,dpcm_a11_en,rst_n);
                    // dsig_a11 toggles every multiframe and starts at 1
```

```
1     wire dsig_a11_en = xshlf ? (tscnt_q7 == 11'd1535) & (frcnt_q6 == mfsz) :
          (tscnt_q7 == 11'd1535) & (frcnt_q4 == mfsz);
      DFF_PE dsig_a11_ctr (dsig_a11,~dsig_a11,bus_bc,dsig_a11_en,rst_n);
      //-------- upstream pcm/sig page switching bit, 2 or 4 bytes early ----------
5                   // upcm_a11 bit toggles every frame and starts at 1,
                    // and at multiframe boundary its set to 1
      wire upcm_a11_d = mfsync_n ? ~upcm_a11 : 1'b1;
      wire upcm_a11_en = xshlf ? (tscnt_q6 == 11'd1531) : (tscnt_q6 == 11'd1533);
      DFF_PE upcm_a11_ctr (upcm_a11,upcm_a11_d,bus_bc,upcm_a11_en,rst_n);
10                  // usig_a11 bit toggles every multiframe and starts at 1
      wire usig_a11_en = (tscnt_q6 == 11'd1531) & (frcnt_q == mfsz);
      DFF_PE usig_a11_ctr (usig_a11,~usig_a11,bus_bc,usig_a11_en,rst_n);
      //--------------------- xstate counter ------------------------------
                    // sync to multiframe, count 0 to 59
15    wire xstate_ld = mf_30m | (xstate == 6'd59);
      wire [5:0] xstate_d = mf_30m ? 6'h2 : 6'h0;
                    // external memory access state counter
      CTR6 xm_ctrl(.Q(xstate),.DIN(xstate_d),.CLK(ck30m),.EN(1'b1),
          .LD(xstate_ld),.RB(rst_n));
20    //------------------------- xmam cycle type control signals --------------------
      // Note: computed two ck30m cycles early and registered for pipelining,
      //   to be used synchronously at next ck30m rise
                    // bus side pcm access every other cycle except every 10th cycle
      wire xm_bpcm_d = ~xstate[0]
25        & (xstate != 6'd58) & (xstate != 6'd08) & (xstate != 6'd18)
          & (xstate != 6'd28) & (xstate != 6'd38) & (xstate != 6'd48);
      // hicap fiber pcm access every fourth cycle
      // locap fiber pcm access every 15th cycle (actually cycles 1, 17, 33 and 49)
      wire xm_fpcm_d = fib_rate ? (xstate[1:0] == 2'b11) :
30        (xstate[3:0] == 4'b1111) | (xstate == 6'd59);
      // hicap fxm access every fourth cycle
```

```
1        // locap fxm access every 15th cycle (actually cycles 7, 23, 39, 55)
         wire xm_fxm_d = fib_rate ? (xstate[1:0] == 2'b01) : (xstate[3:0]==4'b0101);
         // pipeline registers
         DFF_R bpcm_ff(.Q(xm_bpcm),.D(xm_bpcm_d),.CLK(ck30m),.RB(rst_n));
5        DFF_R fpcm_ff(.Q(xm_fpcm),.D(xm_fpcm_d),.CLK(ck30m),.RB(rst_n));
         DFF_R fxm_ff(.Q(xm_fxm),.D(xm_fxm_d),.CLK(ck30m),.RB(rst_n));
         //--------------------------- fxm address mapping -----------------
         wire xmam_csnq_dsa;
                 // map fxm_a[9:0] to low bytes fxm chunks A and B in xmem
10       wire [12:0] xm_fxm0_a = (fxm0_a[9] ? XM_FXM_B : XM_FXM_A) |
         {4'h0,fxm0_a[8:0]};
         wire [12:0] xm_fxm1_a = (fxm1_a[9] ? XM_FXM_B : XM_FXM_A) |
         {4'h0,fxm1_a[8:0]};
                 // map fxm_a[9:0] to high byte fxm3 chunks A and B in xmem
15       wire [12:0] xm_fxm3_0_a = (fxm0_a[9] ? XM_FXM3_B : XM_FXM3_A) |
         {4'h0,fxm0_a[8:0]};
         wire [12:0] xm_fxm3_1_a = (fxm1_a[9] ? XM_FXM3_B : XM_FXM3_A) |
         {4'h0,fxm1_a[8:0]};
                 // map addr[12] to FXM page, addr[1:0] to fxm_d[7:0], fxm_d[15:8]
20       wire xma_pfxm_7 = (addr[15:13]==PR_FXM) & ~addr[12] & (addr[1:0]==2'b11);
         wire xmb_pfxm_7 = (addr[15:13]==PR_FXM) & addr[12] & (addr[1:0]==2'b11);
         wire xmc_pfxm_15 = (addr[15:13]==PR_FXM) & ~addr[12] & (addr[1:0]==2'b10);
         wire xmd_pfxm_15 = (addr[15:13]==PR_FXM) & addr[12] & (addr[1:0]==2'b10);
         // hold off processor accesses to FXM if fxm?_a is within PFXM_HOLD of addr
25       // add PFXM_HOLD to addr, no wraparound as long as PFXM_HOLD < 64
         wire [10:0] addr_p = addr[12:2] + PFXM_HOLD;
         // register fxm_a from online page, with online page bit
         DFF_RE12
         xm_ff18a(.Q(fxm0_a_q),.D(fxm_opg?{1'b1,fxm1_a}:{1'b0,fxm0_a}),.EN(xm_fxm),
30          .CLK(ck30m),.RB(rst_n));
         // OK to start pfxm access if fxm0_a not near addr, or fxm page is not online
```

```
1    wire pfxm_ok = rw_n | (addr_p < fxm0_a_q) | (addr[12:2] > fxm0_a_q);
     // Note: may need to pipeline pfxm_ok
             // hold off access to fxm_d[23:16] until pfxm_ok
             // also, accesses to fxm_d[23:16] go to two memories simultaneously
5    wire xmac_pfxm_23 = pfxm_ok & ~xmam_csnq_dsa & (addr[15:13]==PR_FXM) &
     ~addr[12] & (addr[1:0]==2'b01);
     wire xmbd_pfxm_23 = pfxm_ok & ~xmam_csnq_dsa & (addr[15:13]==PR_FXM) &
     addr[12] & (addr[1:0]==2'b01);
             // fake access to high byte to allow 32 bit accesses, return data = 0
10   wire pfxm_31 = ~xmam_csn & ~xmam_dsa & ((addr[15:13]==PR_FXM) &
     (addr[1:0]==2'b00));
             // map addr[11:2] to fxm chunks A and B in xmem
             // if access to bits 23:16, map to high byte fxm3 chunks A and B in xmem
     wire [12:0] pfxm_a = (addr[1:0]==2'b01 ? (addr[11] ? XM_FXM3_B : XM_FXM3_A) :
15           // else if access to bits 15:8 or 7:0, map to low bytex fxm chunks A and B
             (addr[11] ? XM_FXM_B : XM_FXM_A) ) | {4'h0,addr[10:2]};
             // map addr for fxm as pfxm_a, processor access to pcm memory no mapping
     wire [12:0] pxm_a = (addr[15:13]==PR_FXM) ? pfxm_a : addr[12:0];
     //--------------------------- processor csn register ------------------
20   wire xmam_dsa_d;
             // register xmam_csn to avoid metastability, go high on asic_cs1n high
             // go low on xmam_csn low before xmam_dsa or xmam_dsa_d
     DFF_P
     xm_ff12(.Q(xmam_csnq),.D(~(~xmam_csn&~xmam_dsa_d&~xmam_dsa)),.CLK(ck30
25   m),
             .PB(~asic_cs1n));
     // further qualify xmam_csnq to be inactive (high) if new xmam_dsa_d this cycle
     assign xmam_csnq_dsa = ~(~xmam_csnq & ~xmam_dsa & ~xmam_dsa_d);
     //----------------------- processor data input register/mux ------------------
30   // select data from one of four xmem registers (xm?_proc_q are mutually exclusive)
     //      or return zero if dummy access to high byte of fxm
```

69

```
1       wire [7:0] xmam_do_d = (xma_proc_q ? xmema_di:8'h00) | (xmb_proc_q ?
        xmemb_di:8'h00) |
                (xmc_proc_q ? xmemc_di:8'h00) | (xmd_proc_q ? xmemd_di:8'h00) | (pfxm_31 ?
        8'h00:8'h00);
5       DFF_RE8 xm_ff5a(.Q(xmam_do),.D(xmam_do_d),.CLK(ck30m),
                .EN(xma_proc_q|xmb_proc_q|xmc_proc_q|xmd_proc_q|pfxm_31),.RB(rst_n));
        // miscompare if fxm_23 data from xmema!=xmemc or xmemb!=xmemd
        wire fxm23_mis_d = xmac_f23_q & (xmema_di != xmemc_di) |
                xmbd_f23_q & (xmemb_di != xmemd_di);
10      // inverted ck30m, or scan clock if test_clk_mux
        MUX2TO1
        clkmux_ck30m_n(.X(ck30m_n),.A(~ck30m_log),.B(sck_notree),.SEL(test_clk_mux));
        // register to sync fxm23_mis_clr to ck30m
        DFF_R xm_ff19a(.Q(fxm23_clr_qb),.D(fxm23_mis_clr),.CLK(ck30m_n),.RB(rst_n));
15      // register to edge detect fxm23_mis_clr
        DFF_R xm_ff19b(.Q(fxm23_clr_q2),.D(fxm23_clr_qb),.CLK(ck30m_n),.RB(rst_n));
        // register fxm_23 data miscompare if both memories not the same
        // clear on rising edge of fxm23_clr
        JKFFR xm_ff19(.Q(fxm23_mis_i),.J(fxm23_mis_d),.K(fxm23_clr_qb &
20      ~fxm23_clr_q2),
                .CLK(ck30m),.RB(rst_n));
//--------------------------- dfpcm data input register/mux -------------------------
        // select data from pcm or pcmx memories
        wire [7:0] xmema_c_di = (xma_fpcm_q ? xmema_di:8'h00) | (xmc_fpcm_q ?
25      xmemc_di:8'h00);
                // register dfpcm_in at end of access
                // rf added to xmc_fpcm_q to .EN()
        DFF_RE8
        xm_ff5b(.Q(dfpcm_in),.D(xmema_c_di),.CLK(ck30m),.EN(xma_fpcm_q|xmc_fpcm_q),
30              .RB(rst_n));
//--------------------------- ubpcm data input registers -------------------------
```

```
 1  DFF_RE8
    xm_ff6b(.Q(ubpcm_di_d),.D(xmemb_di),.CLK(ck30m),.EN(xmb_bpcm_q),.RB(rst_n));
    DFF_RE8
    xm_ff6d(.Q(ubpcmx_di_d),.D(xmemd_di),.CLK(ck30m),.EN(xmd_bpcm_q),.RB(rst_n))
 5  ;
    //------------------------ fxm data input registers/muxes -----------------------
    wire [15:0] fxm0_di_lo;// registered fxm data in, locap only
    wire [15:0] fxm1_di_lo;// registered fxm data in, locap only
        // locap fxm data input registers (only change when cs high to save power)
10  DFF_RE8
    xm_ff7a(.Q(fxm0_di_lo[7:0]),.D(xmema_di),.CLK(ck30m);.EN(xma_fxm_q),.RB(rst_n)
    );
    DFF_RE8
    xm_ff7b(.Q(fxm1_di_lo[7:0]),.D(xmemb_di),.CLK(ck30m),.EN(xmb_fxm_q),.RB(rst_n)
15  );
    DFF_RE8
    xm_ff7c(.Q(fxm0_di_lo[15:8]),.D(xmemc_di),.CLK(ck30m),.EN(xmc_fxm_q),.RB(rst_n
    ));
    DFF_RE8
20  xm_ff7d(.Q(fxm1_di_lo[15:8]),.D(xmemd_di),.CLK(ck30m),.EN(xmd_fxm_q),.RB(rst_
    n));
        // bits 23:16 page 0 read from xmema or xmemc
    wire [7:0] fxm3_0_di = (xma_fxm3_q ? xmema_di : xmemc_di);
    DFF_RE8 xm_ff13a(.Q(fxm0_di_d[23:16]),.D(fxm3_0_di),.CLK(ck30m),
25      .EN(xma_fxm3_q|xmc_fxm3_q),.RB(rst_n));
        // bits 23:16 page 1 read from xmemb or xmemd
    wire [7:0] fxm3_1_di = (xmb_fxm3_q ? xmemb_di : xmemd_di);
    DFF_RE8 xm_ff13b(.Q(fxm1_di_d[23:16]),.D(fxm3_1_di),.CLK(ck30m),
        .EN(xmb_fxm3_q|xmd_fxm3_q),.RB(rst_n));
30  // register fxm data on rising fib_bc, hicap from memories, locap from registers
    assign fxm0_di_d[15:0] = fib_rate ? {xmemc_di,xmema_di} : fxm0_di_lo;
```

71

```
1   assign fxm1_di_d[15:0] = fib_rate ? {xmemd_di,xmemb_di} : fxm1_di_lo;
            // reclock to fib_bc rising
    DFF_R24 xm_ff14a(.Q(fxm0_di),.D(fxm0_di_d),.CLK(fib_bc),.RB(rst_n));
    DFF_R24 xm_ff14b(.Q(fxm1_di),.D(fxm1_di_d),.CLK(fib_bc),.RB(rst_n));
5   //--------------------- falling edge data input registers ---------------------
            // don't invert bus_bc in test_clk_mux
    MUX2TO1
    clkmux_bus_bc_n(.X(bus_bc_n),.A(~bus_bc_log),.B(sck_notree),.SEL(test_clk_mux));
    DFF_R8 xm_ff9a(.Q(ubpcm_di),.D(ubpcm_di_d),.CLK(bus_bc_n),.RB(rst_n));
10  DFF_R8 xm_ff9b(.Q(ubpcmx_di),.D(ubpcmx_di_d),.CLK(bus_bc_n),.RB(rst_n));
    //------------------ dfpcm_in input register -------------------------
    DFF_R8 dp8ff2(.Q(dfpcm_in_q),.D(dfpcm_in),.CLK(fib_bc),.RB(rst_n));
    //---- Downstream data = PCM or check or ONU ID or ID_SOP or Overhead ----
            // pcm or check
15  wire [7:0] pcm_chk = ( (fxmdqq_check|fxmdqq_bip) ? dchk : pcm_tt_mf);
            // XOR scrambler output if scrambling enabled
    wire [7:0] spcm_chk = scr_ena ? scram ^ pcm_chk : pcm_chk;
            // generate data for id_sop
    wire [7:0] id_sop = fib_rate ? {sop_ovh[6:1],dpar_do,sop_ovh[0]} : fxmdqq_xcptr[7:0];
20          // scrambled pcm, check or id_sop
    wire [7:0] sp_chk_id = (fxmdqq_id_sop ? id_sop : spcm_chk);
            // insert test input data if enabled
    wire [7:0] test_spsid = test_i_on & (test_sel==TEST_PTD) ? test_i : sp_chk_id;
            // cp_s_id = coded (if code_ena_n) PCM, check, or ONU ID
25  wire [9:0] cp_s_id = code_ena_n ? {2'b0,test_spsid} :
            code(test_spsid) ^ {8{ins_err}};// invert code if ins_err
    wire ovh_cps = (fxmdqq_ovh || fxmdqq_socd);
    wire [9:0] ptd_d = ovh_cps ? fxmdqq_xcptr[9:0] : cp_s_id;
            // ptd output register
30  DFF_R10 dp10ff1(.Q(ptd),.D(ptd_d),.CLK(fib_bc),.RB(rst_n));
    //----------------------- Data packet parity circuitry --------------------
```

72

```
1    wire        par_pend;// parity bit pending - needs to be written
     wire [7:0]onunum;    // ONU number register
     wire [7:0]onunum_q;// ONU number, delayed one fib_bc
     DFF_RE8 dp8ff5(.Q(onunum),.D(fxmd_onunum),.CLK(fib_bc),.EN(fxmd_id_sop),
5               .RB(rst_n));// ONU number register
     // delay ONU number one fib_bc - changes during fxmdqq_id_sop
     DFF_R8 dp8ff4(.Q(onunum_q),.D(onunum),.CLK(fib_bc),.RB(rst_n));
               // XOR with ins_err to cause errors if ins_err set
     assign dparhw_di = ^{ins_err,dchk_d};// parity bit is XOR of BIP byte
10   assign dparhw_a = onunum_q;// address memory with onunum
     // write parity during last byte in packet (next byte is ovh or id_sop or bip)
     assign dparhw_wen = ~((fxmdq_id_sop | fxmdq_bip | fxmdq_ovh) & par_pend);
               // set par_pend at start of data packet, clear when written
     JKFFR dpff10(.Q(par_pend),.J(fxmdqq_id_sop),.K(~dparhw_wen),
15              .CLK(fib_bc),.RB(rst_n));
               // parhw_cs when dparhw_wen or for read during id_sop
     assign dparhw_csn = ~(~dparhw_wen | fxmdqq_id_sop);
     //----------------- data decode circuitry -----------------------------------
     assign {dec_nib,prd_decode} = decode(prd);// decode receive data, detect errors
20             // combine nibble flags into one, mask if coding not enabled
     wire rdc_err = ~code_ena_n & (dec_nib[0] | dec_nib[1]);
               // use decoded data if ~code_ena_n, else just use prd
     wire [7:0] prd_dec_prd = code_ena_n ? prd : prd_decode;
               // insert test input if enabled
25   wire [7:0] prddec_test = test_i_on&(test_sel==TEST_PRD) ? test_i : prd_dec_prd;
                         // descrambled if enabled
     wire [7:0] prd_dec = scr_ena ? prddec_test ^ scram : prddec_test;
     //----------------- signalling/isdn_d4 data register -------------------------
                         // latch signalling data until after PCM timeslot
30   DFF_RE8
     upkblk1(.Q(ufsig_q),.D(prd_dec),.CLK(fib_bc),.EN(fxmu_sig|fxmu_isdn_md),
```

73

```
1       .RB(rst_n));
        //---------------------- Data packet parity circuitry --------------------
        wire        par_pend;// parity bit pending - needs to be written
        wire [7:0]onunum;    // ONU number
5       DFF_RE8 up8ff2(.Q(onunum),.D(fxmu_onunum),.CLK(fib_bc),.EN(fxmu_id_sop),
            .RB(rst_n));// ONU number register
        assign uparhw_di = ^{uchk};// parity bit is XOR of CHECK byte
        assign uparhw_a = onunum;// address memory with onunum
        // write parity after last byte in packet (at bip or ovh or id_sop)
10      assign uparhw_wen = ~((fxmu_bip | fxmu_id_sop | fxmu_ovh) & par_pend);
        // set par_pend at start of data packet, clear when written if not id_sop
        JKFFR dpff10(.Q(par_pend),.J(fxmu_id_sop),.K(~uparhw_wen&~fxmu_id_sop),
            .CLK(fib_bc),.RB(rst_n));
        // delay id_sop one byte
15      DFF_R dpff11(.Q(id_sop_q),.D(fxmu_id_sop),.CLK(fib_bc),.RB(rst_n));
        // uparhw_csn when parhw_wen or for read after id_sop
        assign uparhw_csn = ~(~uparhw_wen | id_sop_q);
        //-------------- downstream pcm/sig/isdn control --------------------------
        wire [5:0] dataih_q;
20      wire proc_en;
        wire [7:0] sig_xcptr,isdn_xcptr;
        wire fxmd_sig_q,fxmd_isdn_mb_q,fxmd_isdn_md_q;
                    // latch sig number during sig (tt or no_tt) timeslots
                    // and this will become address to sgts memory when a pcm
25                  // timeslot has matching frame number (dsig_nmatch =
                    // (pcm_sig_fr_# == current_fr_# + 1))
        DFF_RE8sig_xcptr_reg (sig_xcptr,fxmd_signum,fib_bc,fxmd_sig,rst_n);
                    // latch sig number during isdn_md timeslot and this will
                    // become address to sig memory when an isdn_mb timeslots
30                  // fiber frame matches the current fiber frame
        DFF_RE8 isdn_xcptr_reg (isdn_xcptr,fxmd_signum,fib_bc,fxmd_isdn_md,rst_n);
```

```
1                      // latched high during sig timeslot and clear after
                       // first pcm timeslot
       JKFFR fxmd_sig_reg (fxmd_sig_q,fxmd_sig,fib_bc,fxmd_pcm,rst_n);
                       // first pcm after signalling timeslot used for trunk conditioning
5                      // if pcm's signalling is not cross connected next frame
       wire frst_pcm = fxmd_pcm & fxmd_sig_q & ~dsig_nmatch;
                       // write trunk conditioning code if first pcm and no sig match,
                       // or if sig match write sig cross-connect pointer at the sig
                       // number
10     wire trk_sig_a_en = frst_pcm | dsig_nmatch;
                       // latched high during isdn_md timeslot and clear after
                       // first isdn_mb pair
       JKFFR fxmd_isdn_md_reg
       (fxmd_isdn_md_q,fxmd_isdn_md,fib_bc,fxmd_isdn_mb2,rst_n);
15                     // first isdn_mb pair after an isdn_md timeslot if no active
                       // d channel cross-connect
       wire frst_isdn_mb = fxmd_isdn_md_q & fxmd_isdn_mb2 & ~dd_nmatch;
                       // write latched isdn pointer to fsgts memory during
                       // isdn fiber frame match or trunk condition during
20                     // first isdn_mb pair after isdn_d channel
       wire trk_isdn_a_en = frst_isdn_mb | dd_nmatch;
                       // read fsgts memory during sig or isdn_md timeslots at
                       // sig number
       wire fxmd_sig_isdn = fxmd_sig | fxmd_isdn_md;
25                     // fsgts address is sig_xcptr register if first pcm after
                       // signalling timeslot or signalling match, else is isdn_xcptr
                       // register if first isdn_mb after isdn_md timeslot or isdn_md
                       // match, else is cpu address bus if processor access, else
                       // is sig_num if signalling or isdn_md timeslot, else 0
30     reg [7:0] fsgts_a_reg;
       wire [7:0] fsgts_a = fsgts_a_reg;
```

75

```
1       always @ (trk_sig_a_en or sig_xcptr or trk_isdn_a_en or isdn_xcptr or
                fxmd_signum or addr or proc_en or fxmd_sig_isdn)
        begin
        case({trk_sig_a_en,trk_isdn_a_en,proc_en,fxmd_sig_isdn}) // synopsys parallel_case
5           4'b1000 : fsgts_a_reg = sig_xcptr;
            4'b0100 : fsgts_a_reg = isdn_xcptr;
            4'b0010 : fsgts_a_reg = addr[8:1];
            4'b0001 : fsgts_a_reg = fxmd_signum;
            default : fsgts_a_reg = 8'b0;
10      endcase
        end
                                // fsgts input data is tt bits and xcptr if signalling match,
                                // else isdn bus frame and isdn cross-connect pointer if
                                // isdn match, else is isdn trunk condition code if
15                              // first isdn_mb after isdn_md, else is cpu data bus if a
                                // processor access, else is tt trunk condition code if
                                // first pcm after signalling timeslot, else 0
        reg [13:0]fsgts_m_di_reg;
        wire [13:0]fsgts_m_di = fsgts_m_di_reg;
20      always @ (dsig_nmatch or dd_nmatch or frst_isdn_mb or fxmd_isdn_dx or
                fxmd_xcptr or fxmd_tt or fxmd_isdn_bfr or proc_en or
                dataih_q or datai or frst_pcm)
        begin
        case({dsig_nmatch,dd_nmatch,frst_isdn_mb,proc_en,frst_pcm}) // synopsys
25      parallel_case
            5'b10000 : fsgts_m_di_reg = {fxmd_tt,fxmd_xcptr};
            5'b01000 : fsgts_m_di_reg = {fxmd_isdn_bfr,fxmd_isdn_dx};
            5'b00100 : fsgts_m_di_reg = 14'd1536;
            5'b00010 : fsgts_m_di_reg = {dataih_q,datai};
30          5'b00001 : fsgts_m_di_reg = {2'b11,12'b0};
            default  : fsgts_m_di_reg = 14'b0;
```

```
1    endcase
     end
     //------------------ signalling timeslot memory control ------------------
     wire [13:0] fsgts_m_do,fsgts_m_do_q;
5    wire fsgts_wen,fsgts_m_csn;
                     // fsgts memory write during pcm sig frame match or first isdn_mb2
                     // timeslot after an isdn_mb timeslot or isdn sig frame match or
                     // first pcm after sig timeslot
     wire hw_wr = dd_nmatch | dsig_nmatch | frst_isdn_mb | frst_pcm;
10                   // fsgts memory read during sig (tt or no_tt?) or isdn_md timeslots
     wire hw_rd = fxmd_sig | fxmd_isdn_md;
                     // hardware access indicator for dsack circuit
     assign fsgtshw_csn = ~(hw_wr | hw_rd);
                     // allow processor access to low byte only on idle cycles
15                   // writing to the high byte does not depend on the idle cycle
                     // so cpu access can be sped up
     assign proc_en = ~fsgts_csn & fxmd_idle_m & ~(hw_wr | hw_rd);
                     // processor access read
     wire proc_rd = proc_en & rw_n;
20                   // high byte access write
     wire proc_wr_h = (~addr[0] & proc_en & ~rw_n);
                     // low byte access at high address latches
     wire proc_wr_l = (addr[0] & proc_en & ~rw_n);
                     // on proc access write to high byte the memory
25                   // will get chip selected but this should be ok
     wire fsgts_m_csn_d = ~(proc_wr_l | proc_rd | hw_wr | hw_rd);
                     // fsgts memory chip select register
     DFF_P fsgts_csn_del_reg(fsgts_m_csn,fsgts_m_csn_d,fib_bcq,rst_n);
                     // low byte proc access latches full 14 bits or local
30                   // circuit access latches full 14 bits
     wire fsgts_wen_d = ~(proc_wr_l | hw_wr);
```

77

```
1               // bring wen low one quarter cycle after rising edge
                // of fib_bc to allow for 3.41 nsec of hold time
                // necessary for st(-)=>rwb(-) in the case of read then write
        DFF_P fsgts_wen_del_reg(fsgts_wen,fsgts_wen_d,fib_bcq,rst_n);
5               // latch upper 6 bits of 14 bit write
        DFF_RE6 bsgts_di_high_reg (dataih_q,datai[5:0],fib_bc,proc_wr_h,rst_n);
                // these might need to get swapped?
        wire [7:0] fsgts_do_d = addr[0] ? fsgts_m_do[7:0] : {2'b0,fsgts_m_do[13:8]};
                // processor access read data latch
10      DFF_RE8 fsgts_m_do_reg (fsgts_do_q,fsgts_do_d,fib_bc,proc_rd,rst_n);
                // fsgts output enable for (st) read strobe
                // when proc read or local circuit read
        wire fsgts_oe = proc_rd | hw_rd;
                // fsgts memory always output enabled
15      wire fsgts_oen = 1'b0;
        wire fsgts_st = (fsgts_oe & ~fib_bc) | // read strobe for 3rd and 4th quarter cycle
        (~fsgts_wen & ~fib_bc & fib_bcq_log);// write strobe for 3rd quarter cycle
        //-------------- downstream pcm/sig/isdn address generate -------------------
        wire sig_pcm,page;
20      wire [10:0] dfpcm_a_q;
        reg [11:0] dfpcm_a_d_reg;
        wire [11:0] dfpcm_a_d = dfpcm_a_d_reg;
                // comm buffer active timeslot if com send initiated
                // and comm timeslot
25      wire comm0_rdy = com0_snd & fxmd_commd;
        wire comm1_rdy = com1_snd & fxmd_commd;
                // dowstream concentration when pcm xcptr>=12'hfc0
                // and pcm xcptr<=12'hfc7
                // or signalling xcptr>=12'hfc8 and signalling xcptr<=12'hfcf
30      wire d_conc = (fxmd_pcm & fxmd_xcptr[10:0]>=11'h600) |
        (fxmd_sig & fsgts_m_do[10:0]>=11'h600);
```

78

```
 1              // fiber test active timeslot if fiber side test initiated
                // and fiber test timeslot
        wire ftst_rdy = fxmd_ftest & d_ftst_strt;
                // dfpcm address is xcptr + 16 if com0 active, else
 5              // xcptr + 32 if com1 active, else xcptr + ftst_cnt,
                // if ftest active, else fsgts_m + concentration bit if
                // signalling or isdn_md timeslot, else xcptr
        always @ (fxmd_xcptr or ftst_rdy or comm0_rdy or comm1_rdy
                or fsgts_m_do or d_cnt_ftst or fxmd_sig_isdn or d_conc)
10      begin
            case({comm0_rdy,comm1_rdy,ftst_rdy,fxmd_sig_isdn})// synopsys parallel_case
            4'b1000 : dfpcm_a_d_reg = fxmd_xcptr + 12'd10;
            4'b0100 : dfpcm_a_d_reg = fxmd_xcptr + 12'd20;
            4'b0010 : dfpcm_a_d_reg = fxmd_xcptr + {6'b0,d_cnt_ftst[5:0]};
15          4'b0001 : dfpcm_a_d_reg = fsgts_m_do[11:0] + {8'b0,d_conc,3'b0};
            default : dfpcm_a_d_reg = fxmd_xcptr;
            endcase
        end
                // latch 11 bits of address to dfpcm memory and 12th
20              // bit selects the normal bus or expansion bus page
                // which is a seperate signal to the xmam interface
        DFF_R12dfpcm_a_del_reg ({dfpcmx_sel,dfpcm_a_q},dfpcm_a_d,fib_bc,rst_n);
                // sig_pcm bit indicator high during sig (tt or no_tt)
                // timeslot, ftest timeslot, isdn_md timeslot and upper bit of
25              // bus frame number stored in fsgts (indicates isdn in sig page 0
                // or page 1)
        wire sig_pcm_d = fxmd_ftest | (fxmd_sig & ~d_conc) | (fxmd_isdn_md &
        fsgts_m_do[13]);
                // dfpcm sig_pcm bit register
30      DFF_R sig_pcm_del_reg (sig_pcm,sig_pcm_d,fib_bc,rst_n);
                // page bit indicator high during comm timeslot, ftest timeslot,
```

```
1               // or isdn_md timeslot and lower bit of bus frame number stored
                // in fsgts (indicates isdn in pcm page 0 or page 1) else sig_a11
                // or pcm_a11 bit, page bit set during concentration
        wire page_d = fxmd_commd | fxmd_ftest | d_conc |
5       (fxmd_isdn_md ? fsgts_m_do[12] : (fxmd_sig ? fsig_a11 : fpcm_a11));
                // dfpcm page bit register
        DFF_R page_del_reg (page,page_d,fib_bc,rst_n);
                // dfpcm address formed according to xmam specification
                // dfpcm_a =
10      {1_bit_sig_or_pcm,1_bit_page_0_or_1,11_bit_pcm_addr}
        assign dfpcm_a = {sig_pcm,page,dfpcm_a_q};
                // dfpcm output enable during pcm, commd, ftest, data,
                // isdn_md, isdn_mb1, isdn_mb2, fxmd_sig, floop
        wire dfpcm_oen_d = ~(fxmd_pcm | fxmd_commd | (fxmd_ftest & d_ftst_strt)
15              | fxmd_data | fxmd_isdn_md | fxmd_sig | fxmd_floop
                | fxmd_isdn_mb);
                // dfpcm output enable register
        DFF_P dfpcm_oen_del_reg(dfpcm_oen,dfpcm_oen_d,fib_bc,rst_n);
                // trunk condition if no sig or isdn cross connect that frame
20      wire trk_cond_d = fxmd_isdn_md & (fsgts_m_do[13:0]==14'd1536) |
        fxmd_sig_tt & (fsgts_m_do[13:12]==2'b11);
                // trunk condition indicator register
        DFF_R trk_cond_del_reg (trk_cond,trk_cond_d,fib_bc,rst_n);
                // tt output bits to fiber front end at signalling timeslot only
25              // tt output valid int'l, to flag unused channel which incites
                // downstream trunk conditioning
        DFF_RE2 tt_del_reg(tt,fsgts_m_do[13:12],fib_bc,fxmd_sig,rst_n);
        //----------------------upstream pcm/sig/isdn address generate -------------------------
        wire [11:0] sig_a,isdn_a;
30      wire [1:0] fxmu_isdn_bfr_q;
        wire sig_pend,isdn_pend;
```

80

```
1                    // store pcm cross-connect pointer of pcm timeslot that signalling
                     // data returned at
        DFF_RE12 sig_a_del_reg(sig_a,fxmu_xcptr,fib_bc,usig_match,rst_n);
                     // store isdn_dx pointer of second isdn_mb timeslot that isdn_md
5                    // data returned at
        DFF_RE12 isdn_a_del_reg(isdn_a,fxmu_isdn_dx,fib_bc,ud_match,rst_n);
                     // save the bus frame number if isdn_md is supposed to return
                     // in this frame
        DFF_RE2 fxmu_isdn_bfr_reg (fxmu_isdn_bfr_q,fxmu_isdn_bfr,fib_bc,ud_match,rst_n);
10                   // upstream concentration when pcm xcptr>=12'hfc0
                     // and pcm xcptr<=12'hfc7
                     // or signalling xcptr>=12'hfc8 and signalling xcptr<=12'hfcf
        wire u_conc = fxmu_pcm & fxmu_xcptr[10:0]>=11'h600;
                     // set when sig or isdn match, clear on next idle timeslot,
15                   // do not set when a signalling freeze indication is detected or
                     // if the timeslot is a concentration timeslot
        wire sig_pend_j = fxmu_pcm & usig_match & ~sig_frz & ~u_conc;
        wire isdn_pend_j = fxmu_isdn_mb & ud_match;
        JKFFR sig_pend_reg (sig_pend,sig_pend_j,fib_bc,fxmu_idle_m,rst_n);
20      JKFFR isdn_pend_reg (isdn_pend,isdn_pend_j,fib_bc,fxmu_idle_m,rst_n);
        wire page,sig_pcm;
        wire [10:0] ufpcm_a_q;
        reg [11:0] ufpcm_a_d_reg;
        wire [11:0] ufpcm_a_d = ufpcm_a_d_reg;
25                   // comm active when com delay counters have expired and
                     // the current timeslot is comm or check
        wire com0_rdy = com0_rcv & (fxmu_commd | fxmu_check);
        wire com1_rdy = com1_rcv & (fxmu_commd | fxmu_check);
                     // fiber test active when ftst frame delay count expired
30                   // and current timeslot is ftest
        wire ftest_rdy = fxmu_ftest & u_ftst_strt;
```

81

```
                    // sig or isdn data ready to be cross connected to ufpcm
                    // during first idle timeslot after a sig or isdn_md timeslot
    wire sig_rdy = sig_pend & fxmu_idle_m;
    wire isdn_rdy = isdn_pend & fxmu_idle_m;
                    // ufpcm address is xcptr + 16 if com0 active, else
                    // xcptr + 32 if com1 active, else xcptr + cnt_ftst if
                    // ftest active, else sig_a register if active signalling
                    // timeslot, else isdn_a register if active isdn_md, else xcptr
    always @ (fxmu_xcptr or ftest_rdy or com0_rdy or isdn_a
        or u_cnt_ftst or sig_rdy or isdn_rdy or sig_a or com1_rdy)
    begin
    case({com0_rdy,com1_rdy,ftest_rdy,sig_rdy,isdn_rdy})    // synopsys parallel_case
    5'b10000 : ufpcm_a_d_reg = fxmu_xcptr + 12'd10;
    5'b01000 : ufpcm_a_d_reg = fxmu_xcptr + 12'd20;
    5'b00100 : ufpcm_a_d_reg = fxmu_xcptr + {6'b0,u_cnt_ftst[5:0]};
    5'b00010 : ufpcm_a_d_reg = sig_a;
    5'b00001 : ufpcm_a_d_reg = isdn_a;
    default  : ufpcm_a_d_reg = fxmu_xcptr;
    endcase
    end
                    // latch 11 bits of address to ufpcm memory and 12th
                    // bit selects the normal bus or expansion bus page
    DFF_R12 ufpcm_a_del_reg ({ufpcmx_sel,ufpcm_a_q},ufpcm_a_d,fib_bc,rst_n);
                    // sig_pcm bit indicator high during sig (tt or no_tt?)
                    // timeslot, ftest timeslot, isdn_md timeslot and upper bit of
                    // bus frame number (indicates isdn in sig page 0 or page 1)
    wire sig_pcm_d = fxmu_ftest | sig_rdy | (isdn_rdy & fxmu_isdn_bfr_q[1]);
                    // ufpcm sig_pcm register
    DFF_R sig_pcm_del_reg (sig_pcm,sig_pcm_d,fib_bc,rst_n);
                    // page bit indicator high during comm timeslot, ftest timeslot,
                    // check, or isdn_md timeslot and lower bit of bus frame number
```

```
1                   // (indicates isdn in pcm page 0 or page 1) else sig or pcm all
                    // bit
    wire page_d = fxmu_ftest | fxmu_commd | fxmu_check |
    (isdn_rdy ? fxmu_isdn_bfr_q[0] :
5   (sig_rdy ? fsig_all : fpcm_all));
                    // ufpcm page register
    DFF_R page_del_reg (page,page_d,fib_bc,rst_n);
                    // ufpcm address formed according to xmam specification
                    // ufpcm_a =
10  {1_bit_sig_or_pcm,1_bit_page_0_or_1,11_bit_pcm_addr}
    assign ufpcm_a = {sig_pcm,page,ufpcm_a_q};
                    // upstream write when pcm, com0, com1, check, sig, isdn,
                    // data, floop, or ftest rdy timeslot - freeze sig/pcm when
                    // freeze is high and concentration bit low
15  wire ufpcm_wen_d = ~(fxmu_pcm | com0_rdy | com1_rdy | sig_rdy | isdn_rdy |
    fxmu_isdn_mb |
    fxmu_data | fxmu_floop | (fxmu_ftest & u_ftst_strt)) | freeze | u_conc;
                    // ufpcm write enable register
    DFF_P ufpcm_wen_del (ufpcm_wen,ufpcm_wen_d,fib_bc,rst_n);
20
```

While preferred embodiments have been shown and described, it will be apparent to one of ordinary skill in the art that numerous alterations may be made without departing from the spirit or scope of the invention.

Therefore, the invention is not to be limited except in accordance with the following claims.

What is claimed:

1. A circuit configured to cross-connect data carried in PCM and associated signalling channels of a first side data stream into PCM and associated signalling channels of a second side data stream, wherein the first side PCM channels are received in successive time division multiplexed data frames and the first side signalling channels are received over signalling multiframes comprising a plurality of successive data frames, the cross-connect circuit comprising:

a PCM memory configured to store data carried in first side PCM channels of each data frame at an address corresponding to the respective data frame timeslot in which the PCM channel is received; and a signalling memory configured to store data carried in the first side signalling channels of each signalling multiframe at an address corresponding to the data frame timeslot of its associated PCM channel, wherein the PCM and signalling memories may be configured to be substantially the same size.

2. The cross-connect circuit of claim 1, further comprising a programmable cross-connect control store configured to read data stored in the PCM and signalling memories and transmit them in respective assigned second side PCM and signalling channels.

3. The cross-connect circuit of claim 2, wherein the respective PCM memory and control store are configured such that PCM data for first side PCM channels is stored in the PCM memory for each data frame and is read into the respective assigned second side PCM channels during the ensuing data frame.

4. The cross-connect circuit of claim 3, wherein the respective signalling memory and control store are configured such that signalling data associated with the first side PCM channels is stored in the signalling memory for each signalling multiframe and is read into the respective assigned second side signalling channels during the ensuing signalling multiframe.

5. The cross-connect circuit of claim 1, further comprising means for determining whether received first side data channels in each timeslot of each successive data frame of a signalling multiframe are carrying signalling data, and means for supplying an address to the signalling memory if signalling data is carried in a respective received timeslot, the address corresponding to the data frame timeslot of an associated first side PCM channel.

6. The cross-connect circuit of claim 5, wherein the means for determining whether the received first side data for each timeslot is signalling data comprise a first side control store that receives as an input the timeslot number of the received data channel and performs a look up operation of first side signalling channel assignments.

7. The cross-connect circuit of claim 6, wherein the means for supplying an address to the signalling memory if signalling data is carried in a respective received timeslot comprise a circuit that computes the timeslot number of the first side PCM channel associated with the signalling data based on the respective signalling frame and timeslot numbers of the received data channel and the result of the look up operation performed by the first side control store, the signalling frame number being initialized at the beginning of each new signalling multiframe and incremented with each first side data frame within the signalling multiframe.

8. The cross-connect circuit of claim 1, further comprising means for assembling the second side data stream into data packets.

9. The cross-connect circuit of claim 1, further comprising a first side timeslot counter that outputs a successive timeslot number of a second side data frame for each received data channel of a first side data frame, wherein the timeslot numbers are repeated for each successively received first side data frame.

10. A circuit configured to cross-connect data carried in incoming first side PCM and associated signalling channels into outgoing second side PCM and associated signalling channels, and to cross-connect data carried in incoming second side PCM and associated signalling channels into outgoing first side PCM and associated signalling channels, wherein the incoming first side PCM channels are received in successive time division multiplexed first side data frames and the incoming first side signalling channels are received over signalling multiframes comprising a plurality of successive first side data frames, the cross-connect circuit comprising:

a first PCM memory configured to store data carried in PCM channels of each incoming first side data frame at an address corresponding to the respective first side data frame timeslot in which the PCM channel is received; and a first signalling memory configured to store data carried in the incoming first side signalling channels of each signalling multiframe at an address corresponding to the first side data frame timeslot of its associated PCM channel.

11. The cross-connect circuit of claim 10, wherein the incoming second side PCM channels are received in successive time division multiplexed second side data frames and the incoming second side signalling channels are received over signalling multiframes comprising a plurality of successive second side data frames, further comprising a second PCM memory configured to store data carried in the PCM channels of each incoming second side data frame at an address corresponding to respective assigned first side data frame timeslots; and a second signalling memory configured to store data carried in the second side signalling channels of each signalling multiframe at an address corresponding to respective first side data frame timeslots to which the data carried in their associated PCM channels is assigned.

12. The cross-connect of claim 11, wherein incoming and outgoing first side data frames are transmitted at the same frame rate as the incoming and outgoing second side data frames.

13. The cross-connect of claim 12, wherein incoming and outgoing first side data frames are transmitted at a higher bit rate than the incoming and outgoing second side data frames.

14. The cross-connect circuit of claim 11, further comprising a programmable cross-connect control store configured to read data stored in the first PCM and signalling memories into respective assigned outgoing second side PCM and signalling channels, and to read data stored in the second PCM and signalling memories into respective assigned outgoing first side PCM and signalling channels.

15. The cross-connect circuit of claim 10, further comprising means for assembling the outgoing second side data frames into data packets configured for asynchronous transmission, and means for disassembling received data packets into incoming second side data frames.

16. A circuit configured to cross-connect data carried in first side downstream PCM and signalling channels into second side downstream PCM and signalling channels, and to cross-connect data carried in second side upstream PCM and signalling channels into first side upstream PCM and signalling channels, wherein the first side downstream and upstream PCM channels are received and transmitted, respectively, in successive first side data frames, the first side downstream and upstream signalling channels associated with the first side downstream and upstream PCM channels being received and transmitted, respectively, over signalling multiframes comprising a plurality of successive first side data frames, and wherein the second side downstream and upstream PCM channels are received and transmitted, respectively, in successive second side data frames, the second side downstream and upstream signalling channels associated with the second side downstream and upstream PCM channels being received and transmitted, respectively, over signalling multiframes comprising a plurality of successive second side data frames, the cross-connect circuit comprising:

a first memory having a first portion configured to store data carried in the first side downstream PCM channels at an address corresponding to the first side data frame timeslot in which the PCM data is received, and a second portion configured to store data contained in the first side downstream signalling channels at an address corresponding to the respective first side data frame timeslot of their associated PCM channels; and a second memory having a first portion configured to store data carried in the second side upstream PCM channels at an address corresponding to the first side data frame timeslot in which the PCM data is assigned, and a second portion configured to store data contained in the second side upstream signalling channels at an address corresponding to the respective first side data frame timeslot assigned to their associated PCM channels.

17. The cross-connect circuit of claim 16, further comprising means for determining whether received first side data channels in each timeslot of each successive data frame of a signalling multiframe are carrying signalling data, and means for supplying an address to the signalling memory if signalling data is carried in a respective received timeslot, the address corresponding to the data frame timeslot of an associated first side PCM channel.

18. The cross-connect circuit of claim 17, wherein the means for determining whether the received first side data for each timeslot is signalling data comprise a first side control store that receives as an input the timeslot number of the received data channel and performs a look up operation of first side signalling channel assignments.

19. The cross-connect circuit of claim 18, wherein the means for supplying an address to the signalling memory if signalling data is carried in a respective received timeslot comprise a circuit that computes the timeslot number of the first side PCM channel associated with the signalling data based on the respective signalling frame and timeslot numbers of the received data channel and the result of the look up operation performed by the first side control store, the signalling frame number being initialized at the beginning of each new signalling multiframe and incremented with each first side data frame within the signalling multiframe.

20. The circuit of claim 18, further comprising means for assembling the second side downstream data frames into downstream data packets, and means for disassembling received upstream packets into second side upstream data frames.

* * * * *